United States Patent
Hayashi

(10) Patent No.: US 10,686,945 B2
(45) Date of Patent: Jun. 16, 2020

(54) DIAGNOSIS SYSTEM, DIAGNOSIS METHOD AND STORAGE MEDIUM

(71) Applicant: Koji Hayashi, Kanagawa (JP)

(72) Inventor: Koji Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/238,667

(22) Filed: Jan. 3, 2019

(65) Prior Publication Data

US 2019/0281171 A1   Sep. 12, 2019

(30) Foreign Application Priority Data

Mar. 9, 2018 (JP) .................................. 2018-042771

(51) Int. Cl.
*H04N 1/00* (2006.01)
*G06K 9/46* (2006.01)

(52) U.S. Cl.
CPC .......... *H04N 1/00029* (2013.01); *G06K 9/46* (2013.01); *H04N 1/00005* (2013.01); *H04N 1/00039* (2013.01); *H04N 1/00045* (2013.01); *H04N 1/00087* (2013.01)

(58) Field of Classification Search
CPC .......... H04N 1/00029; H04N 1/00005; H04N 1/00087; H04N 1/00045; H04N 1/00039; G06K 9/46
See application file for complete search history.

(56) References Cited

U.S. PATENT DOCUMENTS

| 2007/0237399 A1* | 10/2007 | Satonaga | G06K 9/4647 382/225 |
| 2014/0139883 A1* | 5/2014 | Hashizume | H04N 1/00015 358/3.06 |
| 2015/0170008 A1* | 6/2015 | Hashizume | H04N 1/00005 358/1.15 |

FOREIGN PATENT DOCUMENTS

| JP | 2007-281959 | 10/2007 |
| JP | 2016-019244 | 2/2016 |

* cited by examiner

*Primary Examiner* — Neil R McLean
(74) *Attorney, Agent, or Firm* — Harness, Dickey & Pierce P.L.C.

(57) ABSTRACT

A diagnosis system includes circuitry configured to form an image to be used for diagnosing the image forming apparatus, receive designation of a first diagnosis condition for detecting abnormality of the image formed by using the image forming apparatus, scan the image formed by the image forming apparatus, using a scanner, extract feature information representing the abnormality from the scanned image in accordance with the designated first diagnosis condition, diagnose the abnormality of the image forming apparatus based on the extracted feature information in accordance with the designated first diagnosis condition, and determine, in response to receiving designation of a second diagnosis condition different from the first diagnosis condition after performing a diagnosis under the first diagnosis condition, whether the feature information extracted for the diagnosis under the first diagnosis condition is usable for a diagnosis under the second diagnosis condition.

9 Claims, 23 Drawing Sheets

| PATTERN TYPE / ABNORMALITY TYPE OF IMAGE | COLOR ADJUSTMENT PATTERN 1 | COLOR ADJUSTMENT PATTERN 2 | UNEVENNESS DETECTION PATTERN | BACKGROUND STAIN/DENSITY DETECTION PATTERN | FULL-COLOR BACKGROUND STAIN/DENSITY DETECTION PATTERN |
|---|---|---|---|---|---|
| THERE IS STAIN | NOT PRINT | NOT PRINT | PRINT | NOT PRINT | PRINT |
| THERE IS FAINT | NOT PRINT | NOT PRINT | NOT PRINT | PRINT | PRINT |
| THERE IS COLOR MISREGISTRATION | PRINT | PRINT | NOT PRINT | NOT PRINT | PRINT |

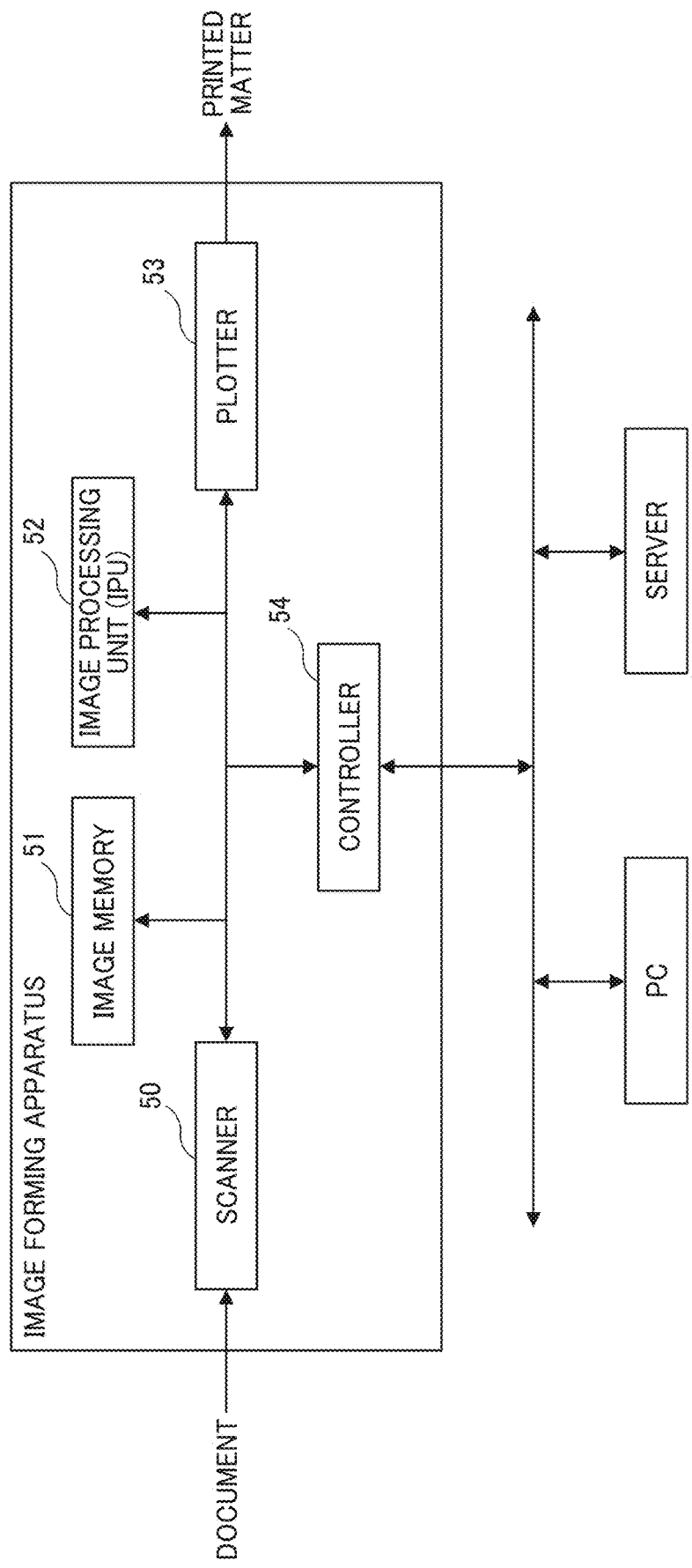

FIG. 4

| PATTERN TYPE / ABNORMALITY TYPE OF IMAGE | COLOR ADJUSTMENT PATTERN 1 | COLOR ADJUSTMENT PATTERN 2 | UNEVENNESS DETECTION PATTERN | BACKGROUND STAIN/DENSITY DETECTION PATTERN | FULL-COLOR BACKGROUND STAIN/DENSITY DETECTION PATTERN |
|---|---|---|---|---|---|
| THERE IS STAIN | NOT PRINT | NOT PRINT | PRINT | NOT PRINT | PRINT |
| THERE IS FAINT | NOT PRINT | NOT PRINT | NOT PRINT | PRINT | PRINT |
| THERE IS COLOR MISREGISTRATION | PRINT | PRINT | NOT PRINT | NOT PRINT | PRINT |

FIG. 8

| | SIMPLE DIAGNOSIS MODE | DETAILED DIAGNOSIS MODE | APPLICATION CONDITION |
|---|---|---|---|
| SKEW AMOUNT | 0 (NO SKEW) TO ±1 DEGREES | +1 TO +4 DEGREES −1 TO −4 DEGREES | WHEN ABNORMALITY CANNOT BE DETECTED IN SIMPLE DIAGNOSIS MODE |
| RESOLUTION | 60 − 150 dpi | 200 − 600 dpi | WHEN ABNORMALITY CANNOT BE DETECTED IN SIMPLE DIAGNOSIS MODE |
| ELONGATION AMOUNT | 0 (NO ELONGATION) TO ±1% | +1 TO +4% −1 TO −4% | WHEN ABNORMALITY CANNOT BE DETECTED IN SIMPLE DIAGNOSIS MODE |

FIG. 9

| | SIMPLE DIAGNOSIS MODE | DETAILED DIAGNOSIS MODE | APPLICATION CONDITION |
|---|---|---|---|
| SKEW AMOUNT | 0 (NO SKEW) TO ± 2 DEGREES (WITHIN ACCEPTABLE CRITERIA) | + 2 TO + 4 DEGREES − 2 TO − 4 DEGREES (OUTSIDE OF ACCEPTABLE CRITERIA) | WHEN ABNORMALITY CANNOT BE DETECTED IN SIMPLE DIAGNOSIS MODE |
| ELONGATION AMOUNT | 0 (NO ELONGATION) TO ±2% (WITHIN ACCEPTABLE CRITERIA) | + 2 TO + 4% − 2 TO − 4% (OUTSIDE OF ACCEPTABLE CRITERIA) | WHEN ABNORMALITY CANNOT BE DETECTED IN SIMPLE DIAGNOSIS MODE |

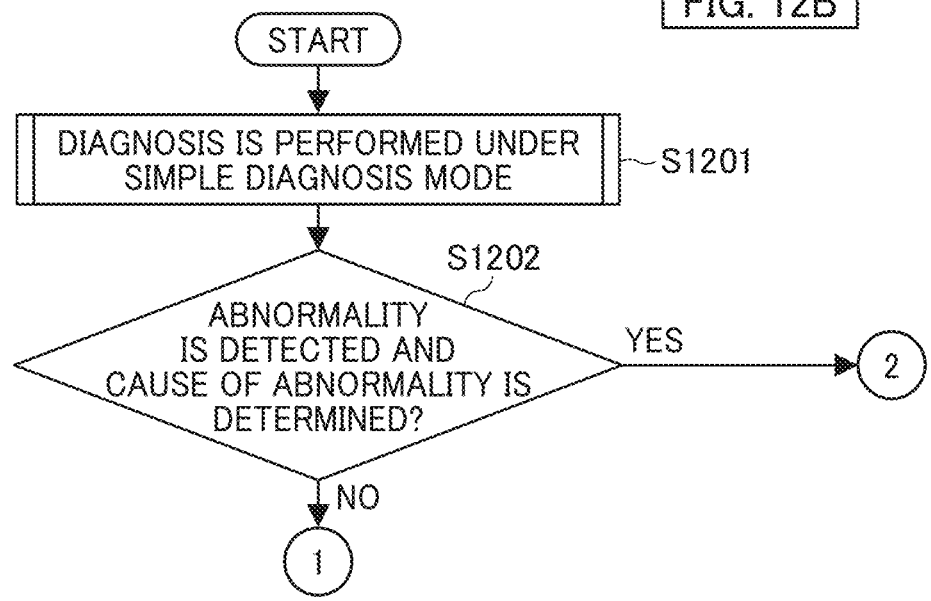

DIAGNOSIS SYSTEM, DIAGNOSIS METHOD AND STORAGE MEDIUM

CROSS-REFERENCE TO RELATED APPLICATION

This application claims priority pursuant to 35 U.S.C. § 119(a) to Japanese Patent Application No. 2018-042771, filed on Mar. 9, 2018 in the Japan Patent Office, the disclosure of which is incorporated by reference herein in its entirety.

BACKGROUND

Technical Field

This disclosure relates to a diagnosis system for diagnosing an image forming apparatus, a method of diagnosing an image forming apparatus, and a storage medium of a program for causing a computer to diagnose an image forming apparatus.

Background Art

When some components, such as photosensitive drums or the like of image forming apparatuses (e.g., printers) are aged over time, images that do not present in an original document image may be formed or unintentional defect images (abnormal images) may be formed on recording media. When the abnormal image is formed on a recording medium at a user site, a customer engineer (CE) visits the user site, performs a visual inspection of the abnormal image, identifies one or more defective components that may cause the abnormal image, and then replaces and cleans the components.

However, with the increase in multifunctionality, advanced multifunctionality, and advanced performance of the image forming apparatuses, causes of failures have been diversified, and it has become difficult to identify the causes of failures even for the CE.

Therefore, a system has been proposed in which a pre-set evaluation chart is printed, a printed evaluation chart is read or scanned, an abnormal image is extracted from the read or scanned image based on information on internal conditions of an apparatus, and then an abnormal image is analyzed to identify the cause of the failure.

SUMMARY

In one aspect of the present invention, a diagnosis system is devised. The diagnosis system includes circuitry configured to form an image to be used for diagnosing the image forming apparatus, using the image forming apparatus, receive designation of a first diagnosis condition among a plurality of diagnosis conditions for detecting abnormality of the image formed by using the image forming apparatus, scan, using a scanner, the image formed by the image forming apparatus, extract feature information representing the abnormality from the scanned image in accordance with the designated first diagnosis condition, diagnose the abnormality of the image forming apparatus based on the extracted feature information in accordance with the designated first diagnosis condition, and determine, in response to receiving designation of a second diagnosis condition different from the first diagnosis condition after performing a diagnosis under the first diagnosis condition, whether the feature information extracted for the diagnosis under the first diagnosis condition is usable for a diagnosis under the second diagnosis condition.

In another aspect of the present invention, a method of diagnosing an image forming apparatus is devised. The method includes forming an image to be used for diagnosing the image forming apparatus, using the image forming apparatus, receiving designation of a first diagnosis condition among a plurality of diagnosis conditions for detecting abnormality of the image formed by using the image forming apparatus, scanning, using a scanner, the image formed by the image forming apparatus, extracting feature information representing the abnormality from the scanned image in accordance with the designated first diagnosis condition, diagnosing the abnormality of the image forming apparatus based on the extracted feature information in accordance with the designated first diagnosis condition, and determining, in response to receiving designation of a second diagnosis condition different from the first diagnosis condition after performing a diagnosis under the first diagnosis condition, whether the feature information extracted for the diagnosis under the first diagnosis condition is usable for a diagnosis under the second diagnosis condition.

In another aspect of the present invention, a non-transitory computer readable storage medium storing one or more instructions that, when performed by one or more processors, cause the one or more processors to execute a method of diagnosing of an image forming apparatus is devised. The method includes forming an image to be used for diagnosing the image forming apparatus, using the image forming apparatus, receiving designation of a first diagnosis condition among a plurality of diagnosis conditions for detecting abnormality of the image formed by using the image forming apparatus, scanning, using a scanner, the image formed by the image forming apparatus, extracting feature information representing the abnormality from the scanned image in accordance with the designated first diagnosis condition, diagnosing the abnormality of the image forming apparatus based on the extracted feature information in accordance with the designated first diagnosis condition, and determining, in response to receiving designation of a second diagnosis condition different from the first diagnosis condition after performing a diagnosis under the first diagnosis condition, whether the feature information extracted for the diagnosis under the first diagnosis condition is usable for a diagnosis under the second diagnosis condition.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 2 illustrates a hardware block diagram of a main configuration of the image forming apparatus of FIG. 1;

FIG. 4 illustrates examples of abnormality types and test charts to be printed;

FIG. 8 illustrates an example of a range of feature value for detecting abnormality for each mode;

FIG. 9 illustrates an example of a range of tolerance and a range outside tolerance for detecting abnormality for each mode;

FIGS. 12A and 12B (FIG. 12) is a flow chart illustrating the steps of processing when a simple diagnosis mode is selected;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Figure 1A:
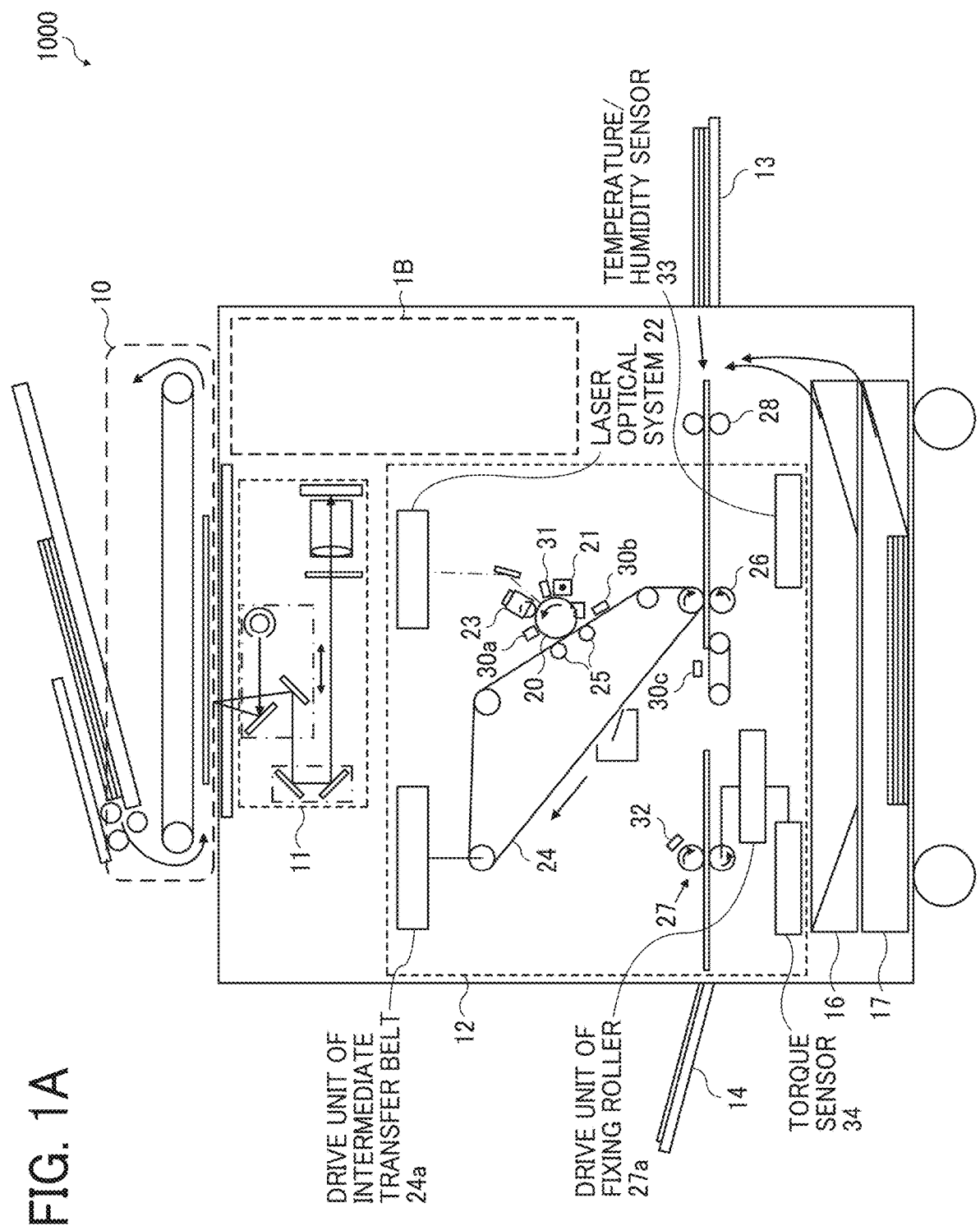
FIGS. 1A and 1B (FIG. 1) illustrate an example of a schematic configuration of an image forming apparatus according to an embodiment.
Figure 1B:
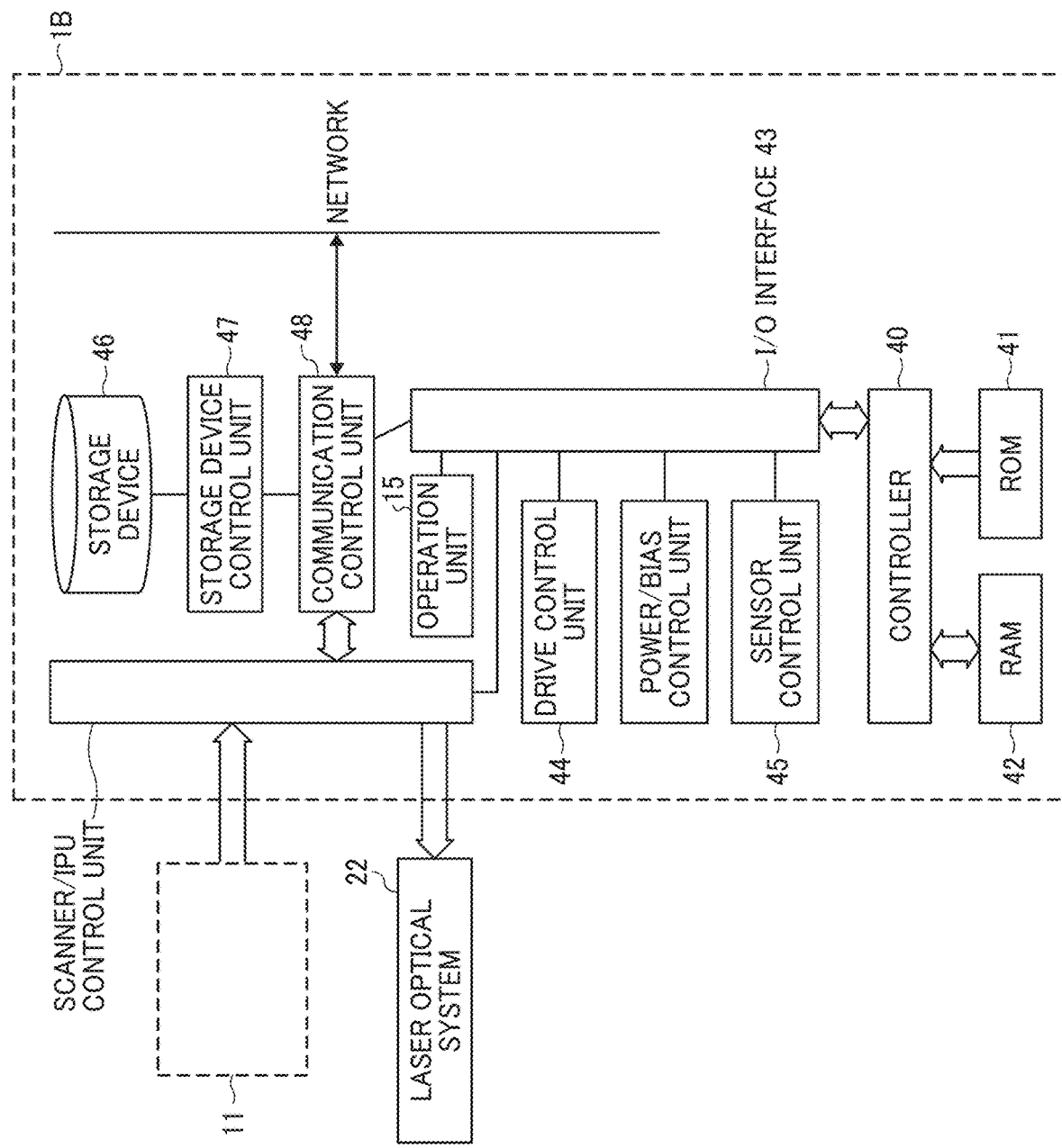

FIGS. 1A and 1B (FIG. 1) illustrate an example of a schematic configuration of an image forming apparatus 1000 according to an embodiment of the present invention. The image forming apparatus 1000 can be any apparatus that can read or scan images and perform an image forming operation. For example, the image forming apparatus 1000 can be a multifunctional apparatus that can perform multiple functions such as a printing function, a copying function, a facsimile function, and a scanner function, a copier, a facsimile machine, or the like. Hereinafter, the image forming apparatus 1000 is described as the multifunctional apparatus The image forming apparatus 1000 includes, for example, an automatic document feeder (ADF) 10, an image scanning unit 11, an image forming unit 12, a control unit, a sheet feed tray 13, a sheet discharge tray 14, and an operation unit 15. The automatic document feeder (ADF) 10 automatically feeds document sheets to the image scanning unit 11 when to scan or read the document sheets. The image scanning unit 11 includes a light source and an image capture device that converts light reflected from the document into electrical signals to scan a document image and outputs image data of the document image.

The image forming unit 12 includes, for example, a photosensitive drum 20, a charging device 21, a laser optical system 22, a development device 23, an intermediate transfer belt 24, a drive unit 24a of the intermediate transfer belt 24, a primary transfer roller 25, a secondary transfer roller 26, a fixing device 27, and a drive unit 27a of a fixing roller. Although the number of each of the photosensitive drum 20, the charging device 21, and the development device 23 is one in FIG. 1, if the image forming apparatus 1000 is a color image forming apparatus that can print color image, the number of devices can be set variably in accordance with the number of colors used for the color image forming apparatus.

While the photosensitive drum 20 rotates in a given direction, the photosensitive drum 20 is charged by the charging device 21, and then a laser beam is irradiated onto the photosensitive drum 20 from the laser optical system 22 to form an electrostatic latent image on the surface of the photosensitive drum 20.

The development device 23 including a development roller deposits toner on a surface of the photosensitive drum 20 using the development roller to form a toner image. The toner image is transferred from the photosensitive drum 20 to the intermediate transfer belt 24 by the primary transfer roller 25, and then transferred by the secondary transfer roller 26 onto a sheet conveyed by the feed roller 28 from the sheet feed tray 13. The sheet is not limited to the sheet fed from the sheet feed tray 13 but the sheet can be also stored in a double-sided tray 16 and a sheet feed bank 17 and can be fed from a set tray. After the toner image is transferred onto the sheet, the sheet is conveyed to the fixing device 27. The fixing device 27, including a fixing roller and a pressure roller, applies heat using the fixing roller and the pressure using the pressure roller to fix the toner image on the sheet. The fixing device 27 ejects the sheet fixed with the toner image to the sheet discharge tray 14.

The image forming unit 12 includes various sensors, such as optical sensors 30a to 30c, a potential sensor 31, a fixing thermopile 32, a temperature/humidity sensor 33, and a torque sensor 34. Each of the optical sensors 30a to 30c detects an amount of toner deposited on the photosensitive drum 20 and the intermediate transfer belt 24. The potential sensor 31 detects a potential on the surface of the photosensitive drum 20. The fixing thermopile 32 detects a surface temperature of the fixing roller. The temperature/humidity sensor 33 detects temperature and humidity inside the image forming apparatus 1000. The torque sensor 34 measures the rotational torque of each roller, such as the development roller, the primary transfer roller 25, the secondary transfer roller 26, and the fixing roller.

As illustrated in FIG. 1B, the control unit includes, for example, a controller 40, a read only memory (ROM) 41, a random access memory (RAM) 42, an input/output (I/O) interface 43, a drive control unit 44, a sensor control unit 45, a storage device 46 such as hard disk drive (HDD), a storage device control unit 47, a communication control unit 48, and the like.

The controller 40, such as circuitry or one or more processors, controls the image forming apparatus 1000 entirely and performs image processing on image data output from the image scanning unit 11. The ROM 41 stores a boot program and firmware, and the RAM 42 provides a work area to the controller 40. The I/O interface 43 connects the controller 40 with each control unit and the operation unit 15 to enable communication of signals.

The drive control unit 44 transmits a control signal to one or more drive circuits for driving the laser optical system 22, the development device 23, the intermediate transfer belt 24, and the like to control the drive circuits.

The sensor control unit 45 processes signals detected and output from each sensor. Specifically, the sensor control unit 45 determines a ratio between the toner amount detected by the optical sensors 30*a* to 30*c*, in which the sensor control unit 45 determines a ratio between the toner deposit amount in the toner image of a test pattern and the toner deposit amount adhering to a background portion, compares the ratio with a reference value to detect fluctuation of image density, and then corrects a control value of the toner density sensor of each color.

The storage device 46 stores image data, an operating system (OS), application programs for operating the image scanning unit 11 and the image forming unit 12. The storage device control unit 47 controls data reading and writing for the storage device 46. The communication control unit 48 connects to a network such as the Internet or an intranet (registered trademark) to control communication through the network.

The operation unit 15 includes an input unit, such as an input button for an input operation by a user, and a display unit for displaying a status of processing to the user. The operation unit 15 can be, for example, an operation panel equipped with a touch panel.

The detailed configuration of the image forming apparatus 1000 is illustrated in FIG. 1. FIG. 2 illustrates a hardware block diagram of a main structure of the image forming apparatus 1000, with which processing performed by each block is to be described. As illustrated in FIG. 2, the image forming apparatus 1000 includes, for example, a scanner 50, an image memory 51, an image processing unit (IPU) 52, a plotter 53, and a controller 54.

The scanner 50 scans or reads a test pattern or test chart to be described later, which is used as one example of original document image. The IPU 52 performs the image processing on the test chart scanned by the scanner 50. The plotter 53 prints image data after the IPU 52 has performed the image processing to generate a printed matter.

The controller 54 controls the image forming apparatus 1000 entirely, exchanges image data between the units, connects to a server or a personal computer (PC) via a network, and transmits and receives image data, detection values of each sensor, or the like. The image memory 51, implemented by the RAM 42, the storage device 46, and the like illustrated in FIG. 1, temporarily stores image data to be processed by each unit and permanently stores the image data for use at a later date.

Due to aging of components such as the photosensitive drum 20, the charging device 21, the development device 23, the intermediate transfer belt 24, and the fixing device 27 over time, fluctuation of environmental conditions, types of sheets to be used, and mismatching of image forming conditions, the image forming apparatus 1000 may form images not present in original document image and/or unintentional images (abnormal images). The fluctuation of environmental conditions includes, for example, fluctuation in temperature, humidity, and the like inside the image forming apparatus 1000. The mismatching of image forming conditions means that detection values of each of the sensors do not match pre-set values such as toner density, charging potential, laser light intensity, fixing temperature, and the like. The formation of abnormal image indicates that there may be abnormality in any component, in which it is necessary to identify an abnormal portion and determine a countermeasure method.

Figure 3:
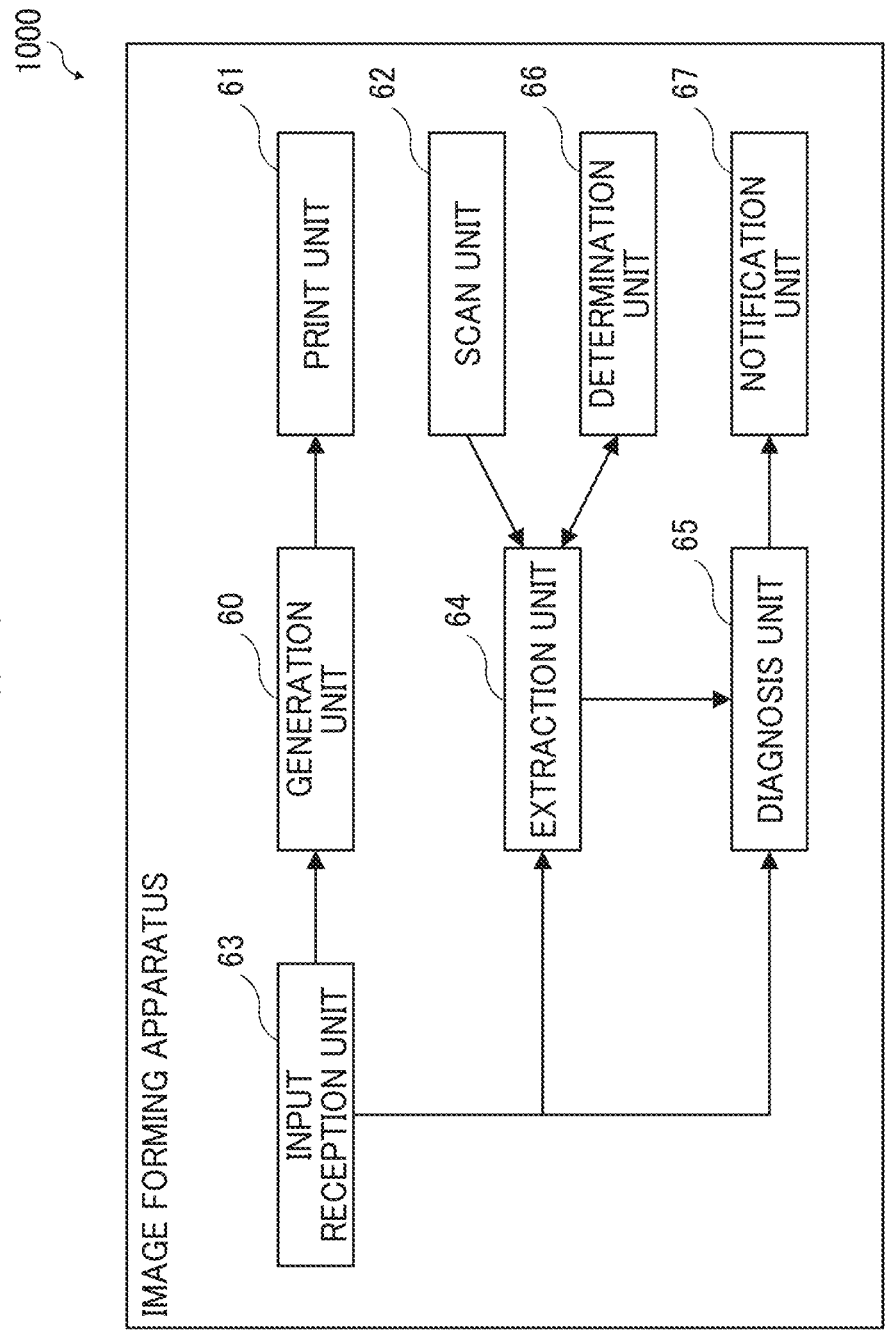
FIG. 3 illustrates an example of a functional configuration of the image forming apparatus of FIG. 1.

Accordingly, the image forming apparatus 1000 performs diagnosis processing of abnormality of the image forming apparatus 1000. FIG. 3 illustrates an example of a functional block diagram of the image forming apparatus 1000. When the controller 54 illustrated in FIG. 2 executes programs, the image forming apparatus 1000 implements each functional unit. As illustrated in FIG. 3, the image forming apparatus 1000 includes functional units, such as a generation unit 60, a print unit 61, a scan unit 62, an input reception unit 63, an extraction unit 64, a diagnosis unit 65, a determination unit 66, and a notification unit 67.

The input reception unit 63 receives a request for performing image diagnosis processing and a selection of a type of abnormality of image from a user. The generation unit 60 generates a test chart as an image to be used for diagnosing the image forming apparatus 1000 in accordance with the type of abnormality selected by the user.

FIG. 4 illustrates examples of abnormality types and test charts. The abnormality types include, for example, three types such as "stain, faint, and color misregistration," which can be selected by the user. Since the three types are just examples, other types can be also used as abnormality. The generation unit 60 determines a pattern to be printed in accordance with the type selected by the user and generates the selected pattern.

The pattern includes, for example, "color adjustment pattern 1, color adjustment pattern 2, unevenness detection pattern, background stain/density detection pattern, full-color background stain/density detection pattern" and the like. The detail of these patterns will be described later. As these patterns are also just examples, other patterns can be included.

For example, if the user selects "there is stain," the generation unit 60 generates the "unevenness detection pattern" and the "full-color background stain/density detection pattern." The background stain indicates that an image is formed on a white portion (i.e., background) of a sheet, wherein the white portion (i.e., background) is not used for printing images.

Referring again to FIG. 3, the generation unit 60 generates two-dimensional code from given information, such as identification information (e.g., machine number) identifying an output apparatus and output date and time as needed. The print unit 61 prints the pattern and the two-dimensional code generated by the generation unit 60. Further, the print unit 61 can print the machine number, the output date, and the like using characters instead of the two-dimensional code.

The input reception unit 63 receives one of a plurality of diagnosis conditions for detecting abnormality of image from a user. The diagnosis conditions include, for example, a diagnosis time period, such as a time period that can be used for diagnosis, which can be also referred to as a diagnosis time limit. The diagnosis time limit is set as an upper limit of the time period that can be used for diagnosis. For example, a first diagnosis time limit T1 can be set by selecting a simple diagnosis mode and a second diagnosis time limit T2 can be set by selecting a detailed diagnosis mode. The diagnosis time limit corresponding to the simple diagnosis mode is the first diagnosis time limit T1 while the diagnosis time limit corresponding to the detailed diagnosis mode is the second diagnosis time limit T2. The relationship of the first diagnosis time limit T1 and the second diagnosis time limit T2 can be defined that the second diagnosis time limit T2 is longer than the first diagnosis time limit T1 (second diagnosis time limit T2>first diagnosis time limit T1).

The scan unit 62 scans or reads a test chart and a two-dimensional code of the printed matter printed by the generation unit 60. The scan unit 62 extracts and acquires information such as a machine number and an output date and time from the scanned or read two-dimensional code.

The extraction unit 64 extracts feature information representing the feature of abnormality from the test chart scanned by the scan unit 62 in accordance with the designated diagnosis condition. In this description, the feature information is extracted as abnormality information. The extracted abnormality information is stored in the storage device 46 such as a HDD. Since the abnormality information is extracted in accordance with the designated diagnosis condition, if the current time counted from the start of diagnosis becomes the diagnosis time limit, the extraction of abnormality information is ended even if the extraction of all of abnormality information related to the test chart is not yet completed.

The diagnosis unit 65 diagnoses abnormality of the image forming apparatus 1000 based on the extracted abnormality information in accordance with the designated diagnosis condition. In this diagnosis, an abnormal portion indicating which part has failed can be identified, and a countermeasure for abnormality, such as replacement of part, cleaning of part and the like can be determined. Since the diagnosis unit 65 performs the diagnosis in accordance with the designated diagnosis condition, if the current time counted from the start of diagnosis becomes the diagnosis time limit, the diagnosis unit 65 ends the diagnosis even if the diagnosis for all of the abnormality information related to the test chart is not yet completed.

After ending the diagnosis by the diagnosis unit 65, if the determination unit 66 receives another diagnosis condition different from the diagnosis condition designated for the diagnosis that has ended (i.e., most-recent diagnosis), the determination unit 66 determines whether the abnormality information that was extracted during the most-recent diagnosis can be used for another diagnosis using another diagnosis condition different from the most-recent diagnosis. The determination unit 66 determines whether the abnormality information that was extracted in the most-recent diagnosis can be used depending on the test chart and the two-dimensional code scanned by the scan unit 62.

The notification unit 67 notifies a result of the diagnosis to a user by displaying a diagnosis result using the operation unit 15. In addition to the notification to the user, the notification unit 67 can also notify the diagnosis result to a service center under an instruction from the user.

As described above, by designating the diagnosis condition, the diagnosis time period can be designated, and it can be determined whether the abnormality information can be used. If the abnormality information can be used, re-extraction of the abnormality information from the test chart is not required, with which the diagnosis time period can be reduced.

Figure 5:
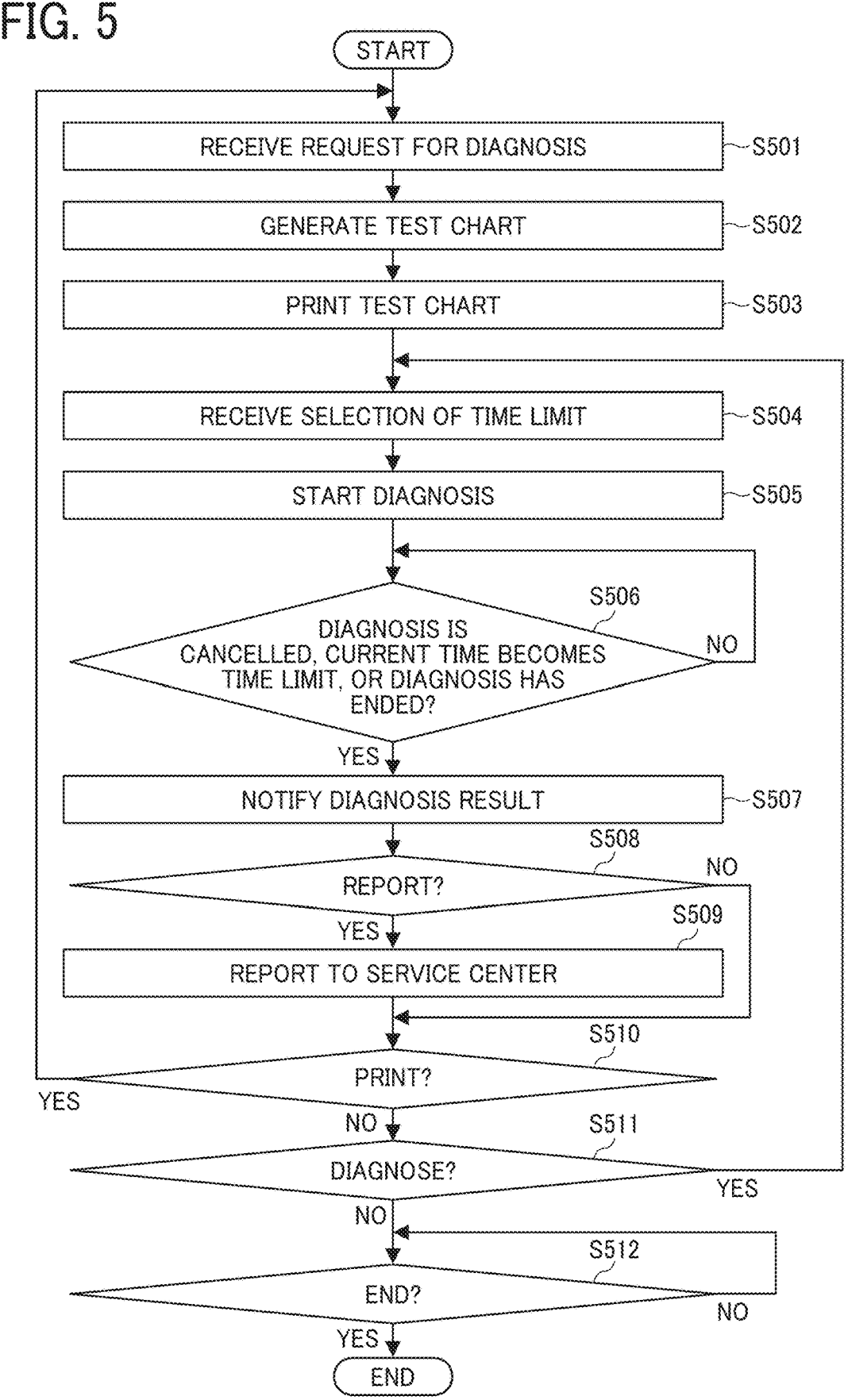
FIG. 5 is a flow chart illustrating the steps of diagnosis processing of the image forming apparatus of FIG. 1.

Hereinafter, a description is given of a process of diagnosing abnormality of the image forming apparatus 1000 with reference to FIG. 5. In response to receiving a request for an image diagnosis processing from a user, the sequence starts. The user can request the image diagnosis processing by selecting the diagnosis mode using the operation unit 15. In this example case, the user selects a type of abnormality of image.

In step S501, the input reception unit 63 receives a request for diagnosis and a selection of the type of abnormality.

In step S502, the generation unit 60 generates a test chart in accordance with the selected type of the abnormality.

In step S503, the print unit 61 prints or forms the test chart generated by the generation unit 60. The image forming apparatus 1000 can display a message on the operation unit 15 to prompt the user to set the printed test chart as printed matter on a document table or the automatic document feeder (ADF) 10 of the scanner 50. The user can check the message displayed on the operation unit 15 and set the document on the document table or the ADF 10.

The user selects a diagnosis time limit set for diagnosis as a diagnosis condition in addition to setting the document. The user can select the diagnosis time limit by selecting the diagnosis mode.

In step S504, the input reception unit 63 receives a selection of the diagnosis time limit. Then, the diagnosis is started in step S505.

In step S506, it is determined whether the input reception unit 63 has received an interruption or abortion (cancellation) of the diagnosis from the user, whether the current time counted from the start of diagnosis becomes the diagnosis time limit, or whether the diagnosis has completed. The diagnosis time limit is measured by a timer. If the current time counted from the start of diagnosis becomes the diagnosis time limit, a timer interruption is performed.

If the cancellation is not received, the current time counted from the start of diagnosis is still within the diagnosis time limit, or the diagnosis has not completed (S506: NO), the diagnosis is being continued. On the other hand, if the cancellation is received, if the current time counted from the start of diagnosis becomes the diagnosis time limit, or if the diagnosis has completed (S506: YES), the sequence proceeds to step S507 to notify the diagnosis result to the user.

If the diagnosis of all of abnormal portions has completed, the diagnosis result includes diagnosis results of all abnormal portions. However, if the cancellation is received or if the current time counted from the start of diagnosis becomes the diagnosis time limit, the diagnosis result includes diagnosis results of a part of abnormal portions. The notification to the user can be performed by displaying abnormality information on the operation unit 15 such as the presence or absence of abnormal portion. If the presence of abnormal portion is identified, an abnormality type, a portion where the abnormality occurs, and a countermeasure method are further displayed as the abnormality information to notify the abnormality information to the user. The notification can be performed by the notification unit 67.

When the user receives a notification of the diagnosis result, the user uses the operation unit 15 to select whether to "report" the diagnosis result to the service center, to "print" the test chart to start the diagnosis again from the beginning, to "diagnose" by changing the diagnosis mode, or to "end the diagnosis."

The "print" may be selected when the type of the previously selected abnormality is to be changed to another type of abnormality. The "diagnose" may be selected when the user wants to detect abnormality in more detail.

In step S508, it is confirmed whether a selection received by the input reception unit 63 is "report." If the selection is "report" (step S508: YES), the sequence proceeds to step S509 and the user reports the diagnosis result to the service center via the network. The report to the service center can be performed using the above described notification unit 67. If the selection is not "report" (step S508: NO) or after the reporting in step S509, the sequence proceeds to step S510.

In step S510, it is determined whether the selection received by the input reception unit 63 is "print." If the selection is "print" (step S510: YES), the sequence returns to step S501 and the sequence is performed again from the step of receiving the request for diagnosis. If the selection is not "print" (step S510: NO), the sequence proceeds to step S511.

In step S511, it is confirmed whether the selection received by the input reception unit 63 is "diagnose." If the selection is "diagnose" (step S511: YES), the sequence returns to step S504 and the sequence is performed again from the step of receiving the selection of the diagnosis time limit by selecting the diagnosis mode. If the selection is not "diagnose" (step S511: NO), the sequence proceeds to step S512.

In step S512, it is confirmed whether the selection received by the input reception unit 63 is "end." If the selection is "end" (step S512: YES), the sequence of diagnosing the abnormality of the image forming apparatus 1000 is ended. The process of step S512 is repeated until "end" is selected.

Figure 6:
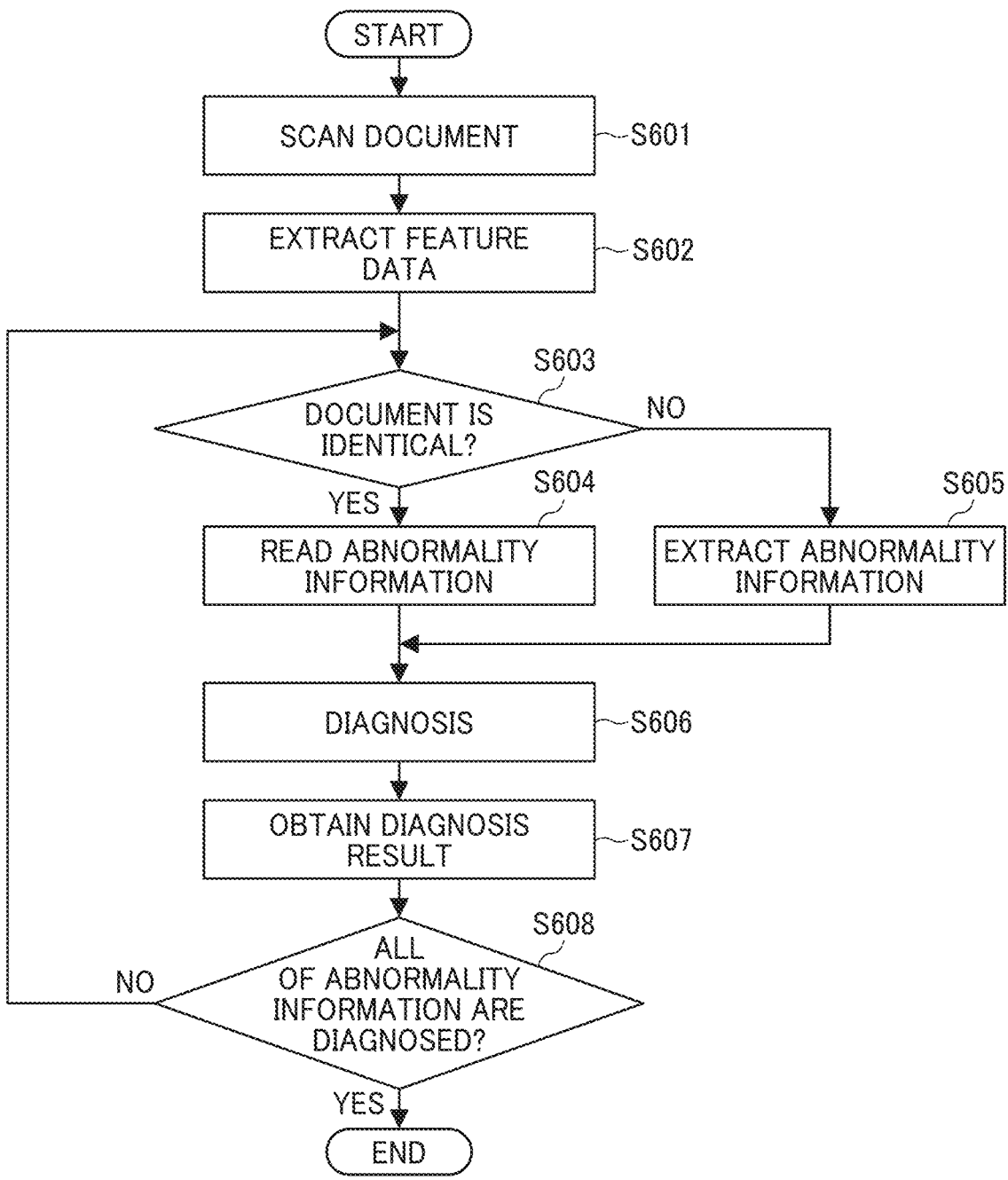
FIG. 6 is a flow chart illustrating the steps of detailed diagnosis processing.

Hereinafter, a description is given of a detail of diagnosis processing with reference to FIG. 6. After starting the diagnosis in step S505 (FIG. 5), the sequence of FIG. 6 starts.

In step S601, the scan unit 62 scans or reads a document.

In step S602, the extraction unit 64 extracts information identifying the document from image data of the scanned document and then generates feature data of a test chart based on the extracted information. The generated feature data is stored in the storage device 46.

In step S603, the determination unit 66 determines whether the document scanned by the scan unit 62 is the same as the document previously scanned by the scan unit 62, that is, whether the two documents are output substantially within the same time range by the same image forming apparatus 1000. The determination whether the document scanned by the scan unit 62 is the same as the document previously scanned by the scan unit 62 is performed by comparing the feature data stored in the storage device 46 and then determining whether the feature data are identical. The determination can be performed using first to third methods to be described below.

The first method for determining whether the document scanned by the scan unit 62 is the same as the document previously scanned by the scan unit 62 is performed using the machine number extracted from the two-dimensional code or acquired by character recognition, in which it is determined whether the machine number acquired from the currently-scanned document matches the machine number acquired from the previous document.

If the machine number is not printed, the second method for determining whether the document scanned by the scan unit 62 is the same as the document previously scanned by the scan unit 62 is performed using information on characteristic abnormal portion, such as shapes along a main scanning direction are identical or similar, in which it is determined whether the information on characteristic abnormal portion matches completely or partially. The main scanning direction corresponds to a direction perpendicular to a moving direction of the document when the document is scanned while the sub-scanning direction corresponds to the moving direction of the document. The above described shape is not limited to a shape aligned in the main scanning direction, but the above described shape can be a shape that is aligned in the sub-scanning direction, or the shape may be both the shape aligned in the main scanning direction and the shape aligned in the sub-scanning direction.

The similarity of shapes can be determined using an index of a similarity level, in which the similarity of shapes can be determined whether the similarity level is equal to or greater than a threshold value. The similarity level can be calculated using known calculation formula, such as Sum of Squared Difference (SSD), Sum of Absolute Difference (SAD), and Normalized Cross-Correlation (NCC). These calculation formulas are known, and thereby not described in detail herein.

When the resolution scanned by the simple diagnosis mode and the resolution scanned by the detailed diagnosis mode are equal to each other, the third method for determining whether the document currently scanned by the scan unit 62 is the same as the document previously scanned by the scan unit 62 is performed to determine whether an image diagnosed by the simple diagnosis mode is further diagnosed by the detailed diagnosis mode.

In the third method, although the diagnosis modes are different, the same document is scanned using the same resolution, with which the diagnosis can be performed using the previously read image data without reading or scanning the document again.

If the determination unit 66 determines that the documents are identical (step S603: YES), the sequence proceeds to step S604. In step S604, abnormality information previously extracted and stored is read out.

One the other hand, if the determination unit 66 determines that the documents are different (step S603: NO), the sequence proceeds to step S605. In step S605, the extraction unit 64 extracts abnormality information from the image data of the document scanned in step S601, and the extracted abnormality information is stored in the storage device 46.

The abnormality information includes various information, such as presence or absence of background stain, too high or too thin density, presence or absence of damage on a surface of the photosensitive drum 20, a size of damage on the surface of the photosensitive drum 20, presence or absence of stain due to toner adhesion, a size of stain due to toner adhesion, and presence or absence of density unevenness of image. The abnormality information can include other information, such as information indicating a position in the main scanning direction and the sub-scanning direction indicating a location of the abnormality occurrence, information indicating presence or absence of periodicity of abnormality, information indicating an interval when the periodicity of abnormality is observed, information on stain indicating too low density or too high density, information indicating whether the shape is a stripe, information indicating whether the shape is a band greater than the stripe, information indicating whether the shape is raindrop, and information indicating whether the abnormality is a single or a group.

The information on the position in the main scanning direction and the position in the sub-scanning direction can be, for example, information occurring every 10 cm in the main scanning direction and the sub-scanning direction.

In step S606, the diagnosis unit 65 diagnoses abnormality of the image forming apparatus 1000 based on the read or extracted abnormality information. When the diagnosis is performed using the read abnormality information, the diagnosis unit 65 can process the abnormality information. For example, in the simple diagnosis mode, information on an abnormal portion in an image is acquired from image data having an image resolution of 300 dot per inch (dpi). In the detailed diagnosis mode, information on an abnormal portion corresponding to an image resolution of 600 dpi is required, so that the acquired image data of the abnormal portion having the resolution of 300 dpi is converted into image data having the resolution equivalent to the resolution of 600 dpi.

The diagnosis unit 65 analyzes the cause of abnormality based on the information on the abnormal portion acquired by processing the abnormality information. When the causes of abnormality are analyzed, a portion or part where the abnormality (defect) occurring in the image forming apparatus 1000 is estimated.

At first, the abnormality of image is classified, for example, into the following ten items of (1) to (10).

(1) vertical black (color) stripe, vertical black (color) band
(2) vertical white (color) stripe, vertical white (color) band
(3) toner drop
(4) black (color) dot
(5) white dot
(6) thin density
(7) background stain
(8) residual image/offset
(9) density unevenness in sub-scanning direction, horizontal stripe/band
(10) density unevenness in main scanning direction, density unevenness in left and right The stripe is linear, and the band has a given width, which are elongated in one direction. The toner drop means the toner is dropped. The black dot and white dot indicates a black point and a white point, respectively. The background stain is a stain caused by a toner adhering to a portion where toner is not supposed to be adhered. The residual image/offset means the previously printed image remains and appears faintly on sheet. The density unevenness means that the density is not uniform due to a thick density portion and a thin density portion.

Since each of the classified items can be related to each component of the image forming apparatus 1000, the portion where the abnormality occurs in the image forming apparatus 1000 can be estimated based on the classified item information.

In step S607, the diagnosis unit 65 determines the presence or absence of abnormal portion and the portion where the abnormality occurs as a diagnosis result. If the abnormality occurs at one portion, the diagnosis unit 65 determines a countermeasure method corresponding to the one portion where the abnormality occurs.

In step S608, it is checked whether all of the abnormality information of the document is read out or extracted. If there is any abnormality information that has not yet been read or if there is any abnormality information that has not yet been extracted (S608: NO), the sequence returns to step S603. On the other hand, if all of the abnormality information of the document is read or extracted (S608: YES), the sequence of diagnosis processing is ended.

Further, if the current time counted from the start of diagnosis becomes the diagnosis time limit or the cancellation is received, the diagnosis process ends at the time when the current time counted from the start of diagnosis becomes the diagnosis time limit or when the cancellation is received.

Figure 7:
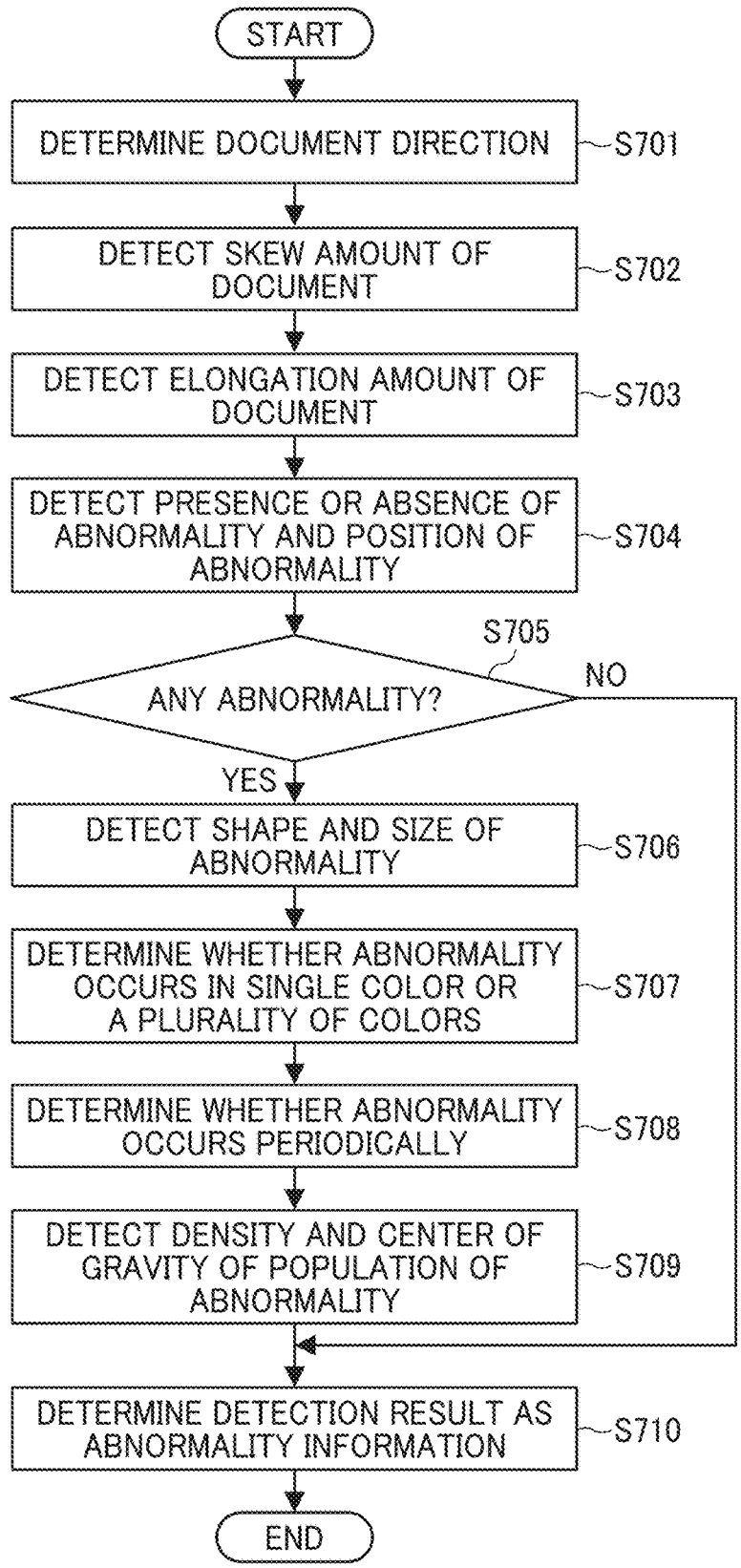
FIG. 7 is a flowchart illustrating the steps of detecting abnormality from image data of a test chart.

Hereinafter, a description is given of step S605 for extracting abnormality information (FIG. 6) in detail with reference to FIG. 7. As to the extraction of abnormality information, in step S701, a direction that the document is scanned by the scan unit 62 is determined using the image data of the document scanned by the scan unit 62. The direction that the document is scanned by the scan unit 62 is referred to as the document direction. In step S701, a printed direction of document and a direction of document placed on a document table or the automatic document feeder (ADF) 10 are detected using a dragonfly pattern, characters, the two-dimensional code, and the like printed on the test chart. The dragonfly pattern is a pattern provided at four corners of sheet, which is used for setting a printing area.

In step S702, an inclination (skew amount) of document is detected from the image data. The inclination of document can be detected, for example, from the dragonfly pattern printed on the test chart.

In step S703, an elongation amount of document is detected from the image data. The elongation amount of document can be also detected from the dragonfly pattern printed on the test chart.

In step S704, the presence or absence of abnormal portion in the image is detected from the image data. If the presence of abnormal portion is detected, a position where abnormality occurs is detected. The position where abnormality occurs can be detected using the image data alone, but not limited thereto. Since the direction (orientation) of document is not always the same, the document may be tilted while feeding the document using the ADF 10, and the document sheet expands and contracts depending on temperature and humidity, the position where abnormality occurs can be detected using the direction (orientation) of the document, the detected skew amount, and the detected elongation amount determined in steps S701 to S703. With this configuration, the detection accuracy of the occurrence position of abnormality can be enhanced.

In step S705, the presence or absence of abnormality is determined based on the presence or absence of abnormality portion. If it is determined that the abnormality is present (S705: YES), the sequence proceeds to step S706.

In step S706, the shape and size of the abnormality occurring at the position detected in step S704 are detected. The size of abnormality can be determined whether the abnormality is, for example, a stripe pattern or a dot pattern. In a case of the stripe pattern, a length of the stripe can be determined, and it is determined whether an edge of the stripe is sharp or blurred. If the edge of the stripe is sharp, it can be assumed that the abnormality is caused by an optical system that performs writing and scanning, and if the end of the stripe pattern is blurred, it can be assumed that the abnormality is caused by a factor other than the optical system.

In step S707, it is determined whether the abnormality occurs in a color plate of any one of yellow (Y), magenta (M), cyan (C), black (K), in all of the color plates of YMCK, in any of two color plates of YMCK, or in any of three color plates of YMCK. In this determination, the abnormality in the single color or a plurality of colors are determined, and it can be determined whether the abnormality occurs at a position before the primary transfer stage (toner transfer from the photosensitive drum 20 to the intermediate transfer belt 24) or at a position after the primary transfer stage. That is, it can be determined that the abnormality occurs at the position before the primary transfer stage if the abnormality occurs in the single color, and it can be determined that the abnormality occurs at the position after the primary transfer stage if the abnormality occurs in the plurality of colors.

In step S708, it is determined whether the abnormality occurs periodically or cyclically. The periodically or cyclically occurring abnormality is abnormality caused by rotating parts (rotators) such as the photosensitive drum 20, the development roller, the primary transfer roller 25, the secondary transfer roller 26, and the like. Since the cycle of the rotators are different depending on the rotators, it can be estimated which rotator causes the abnormality based on the occurring cycle of abnormality.

The occurring cycle of abnormality can be detected with higher accuracy even if the abnormality has a complex form by calculating, for example, an auto-correlation function and using the calculated auto-correlation function. The auto-correlation function is a function used for calculating the occurring cycle of abnormality when there is a repeating component in the image. Since the auto-correlation function is a known function, the auto-correlation function is not described in detail.

Since the use of the auto-correlation function increases the computational load and takes a longer time to calculate, it is preferable to use the auto-correlation function when a longer calculation time is acceptable such as when the detailed diagnosis mode is selected.

In the simple diagnosis mode, the longer calculation time may not be acceptable or allowed. Therefore, instead of the auto-correlation function, a rectangle is calculated based on a size of the abnormality portion, and an average value of the rectangle is calculated to calculate the period or cycle under the simple diagnosis mode. Further, the period or cycle of complex abnormality shape can be calculated under the simple diagnosis mode using a lower resolution compared to the detailed diagnosis mode and the auto-correlation function. The lower resolution means converting, for example, image data of 600 dpi into image data of 300 dpi, which is lower than 600 dpi.

The abnormality information is extracted using any one of a parameter and a step used for performing the extraction, or both of the parameter and the step used for performing the extraction. A range of the parameter used in the detailed diagnosis mode is set wider than a range of the parameter used in the simple diagnosis mode. A value of step used in the detailed diagnosis mode is set smaller than a value of step used in the simple diagnosis mode. The parameter indicates a feature detection range related to a feature value representing the image feature of document. For example, the feature detection range can be a range of elongation amount of document. The value of step represents a unit for performing the extraction, which is referred to as an extraction value unit in this description. For example, the value of step (extraction value unit) corresponds to an interval value used for detecting the cyclic abnormality. Specifically, a first detection range of a feature value representing an image feature of document is set for the first diagnosis condition corresponding to the simple diagnosis mode, and a second detection range of the feature value representing the image feature of document is set for the second diagnosis condition corresponding to the detailed diagnosis mode, in which the second detection range of the feature value used for the second diagnosis condition is set greater than the first detection range of the feature value used for the first diagnosis condition. Further, a first extraction value unit is set for the first diagnosis condition to extract the feature information for the simple diagnosis mode, and a second extraction value unit is set for the second diagnosis condition to extract the feature information for the detailed diagnosis mode, in which the second extraction value unit used for the second diagnosis condition is set smaller than the first extraction value unit used for first second diagnosis condition.

Specifically, when the range of the elongation amount in the simple diagnosis mode is set to ±1% for the cyclic abnormality detection, the range of the elongation amount in the detailed diagnosis mode can be set to, for example, a range of ±5%, which is wider than the range of ±1% set for the simple diagnosis mode. In this example case, the range of ±5% is set for the detailed diagnosis mode, but not limited thereto.

Further, when the cyclic abnormality detection under the simple diagnosis mode is calculated by setting an interval of ±2 mm with respect to a length of 60 mm, the cyclic abnormality detection in the detailed diagnosis mode can be calculated by setting an interval of, for example, ±1 mm, which is smaller than the interval of ±2 mm set for the simple diagnosis mode. Further, in the cyclic abnormality detection, the detectable skew angle can be set greater to enhance the detection accuracy of the occurrence position of abnormality.

Since the diagnosis time limit is set shorter for the simple diagnosis mode, the cyclic abnormality of the rotator is detected within a fluctuation in the tolerance of the rotator. Since the diagnosis time limit is set longer for the detailed diagnosis mode, the cyclic abnormality of the rotator can be detected outside the tolerance. The tolerance is a difference between the maximum value and the minimum value of a permissible or allowable error indicating a permissible or allowable rage.

More specifically, as illustrated in FIG. 8, the cyclic abnormality detection under the simple diagnosis mode is performed using the skew amount set with a range of 0 (no skew) to ±1 degrees. If the cyclic abnormality cannot be detected under the simple diagnosis mode using the skew amount set with the range of 0 to ±1 degrees, the cyclic abnormality detection in the detailed diagnosis mode can be performed using the skew amount set with a range of +1 to +4 degrees and a range of −1 to −4 degrees, which are outside the range of 0 to ±1 degrees set for the simple diagnosis mode. This is the same for the elongation amount of sheet. In this example case, the detailed diagnosis mode is applied under a condition that the cyclic abnormality cannot be detected under the simple diagnosis mode, but the application condition is not limited to thereto.

Further, as illustrated in FIG. 9, as to the fluctuation within the tolerance and the fluctuation outside the tolerance, if the skew amount is set with a range of 0 (no skew) to ±2 degrees as the tolerance (within acceptable range), the cyclic abnormality can be detected using the skew amount set with a range of +2 to +4 degrees (+2 degrees or more) and a range of −2 to −4 degrees (−2 degrees or less) as unacceptable range. In this example case too, when the cyclic abnormality cannot be detected under the simple diagnosis mode, the cyclic abnormality can be detected outside the acceptable range using the detailed diagnosis mode. This is the same for the elongation amount of sheet.

Referring again to FIG. 7, in step S709, the density and the center of gravity of the abnormality population are detected. As a result, it can be detected whether the abnormality occurs uniformly on the entire surface, in a group, or in an isolated portion.

If it is determined that there is no abnormality in step S705 (S705: NO) or after the density and the center of gravity are detected in step S709, the sequence proceeds to step S710. In step S710, the detection result is determined as abnormality information on the test chart, and then the sequence of extracting the abnormality information is ended.

If the simplified diagnosis mode is selected and the diagnosis under the simple diagnosis mode is ended, and further the current time counted from the start of diagnosis is still within the diagnosis time limit, the diagnosis mode can be automatically shifted to the detailed diagnosis mode and the diagnosis can be performed under the detailed diagnosis mode within the diagnosis time limit. The automatic mode shifting can be performed by designating the detailed diagnosis mode using the diagnosis unit 65. By this automatic mode shifting, the diagnosis result of abnormality that cannot be acquired under the simple diagnosis mode can be detected. Further, the automatic mode shifting can be performed in a case when the diagnosis result cannot be acquired under the simple diagnosis mode.

The diagnosis processing for the image forming apparatus 1000 can be performed as described above. Hereinafter, a description is given of screens displayed for a user using the operation unit 15 and receiving an input of the user with reference to FIGS. 10 (10A, 10B, 10C and 10D) and 11 (11A, 11B, 11C and 11D).

Figure 10A:
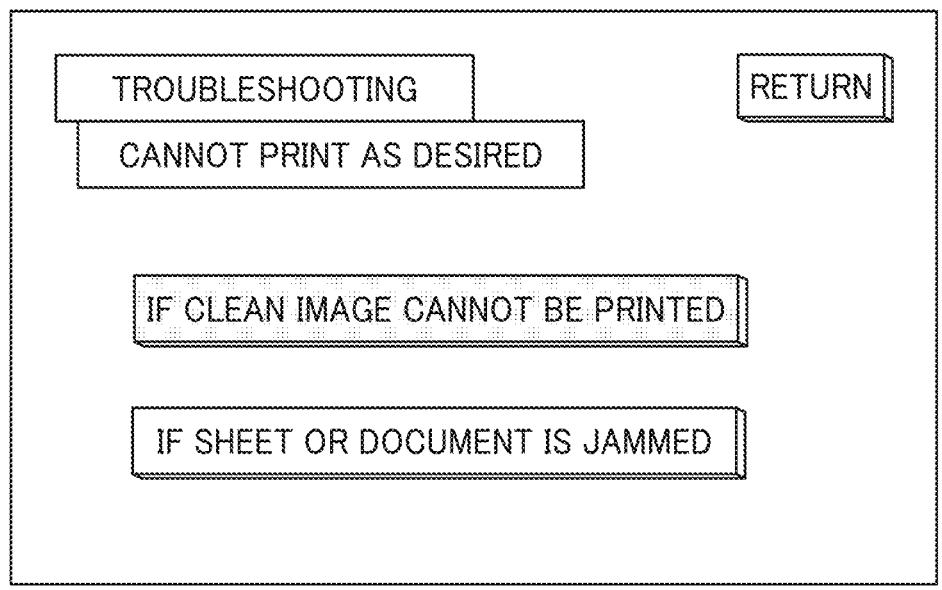
FIGS. 10A, 10B, 10C and 10D (FIG. 10) illustrate an example of shifting of operation screens.

FIG. 10A illustrates an example of a troubleshooting screen selected by a user when a trouble occurs. In this example case, a screen is displayed when a user selects "cannot print as desired," and then the user selects "clean image cannot be printed." In addition to "cannot print as desired," a troubleshooting screen of "periodic inspection and cleaning method" can be applied. Each option on the screen can be selected by pressing a button displaying each item.

Figure 10B:
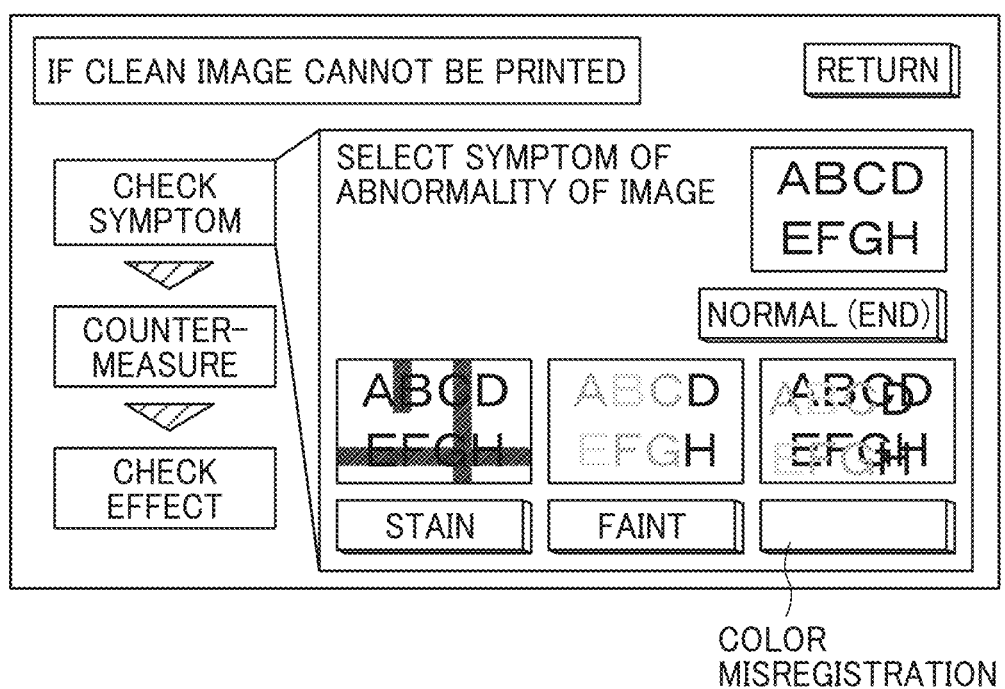

FIG. 10B illustrates a screen when "if clean image cannot be printed" is selected in FIG. 10A. The user can select symptoms of trouble or abnormality of image from four options of "stain, faint, color misregistration, and normal." In this example case, the user selects "stain" as the symptom.

Figure 10C:
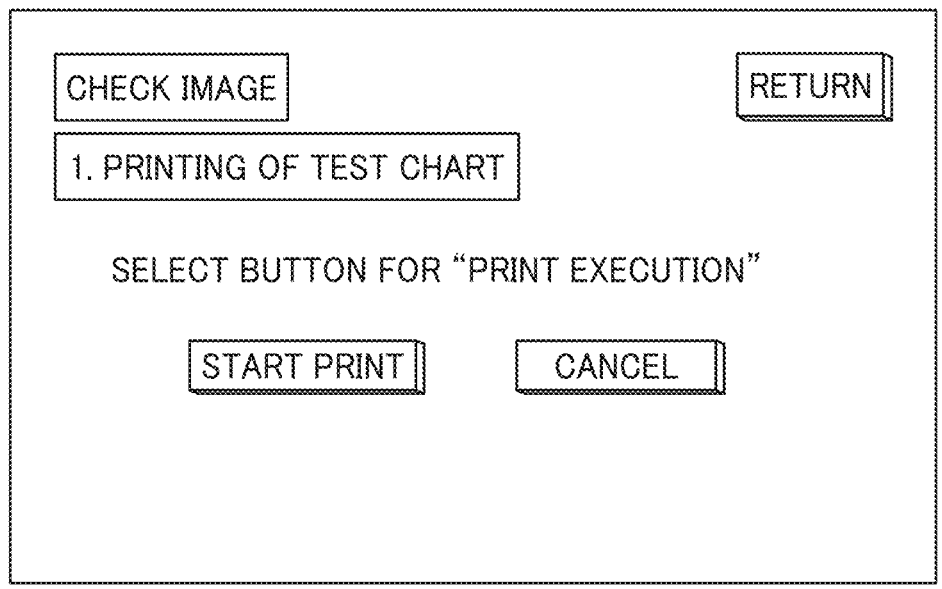

FIG. 10C illustrates a screen when "stain" is selected in FIG. 10B, in which a test chart corresponding to the symptom of "stain" is generated and the printing of the generated test chart is prompted to a user. The user can select "start print" to perform the printing of the test chart. If the user does not perform the printing, "cancel" can be selected.

Figure 10D:
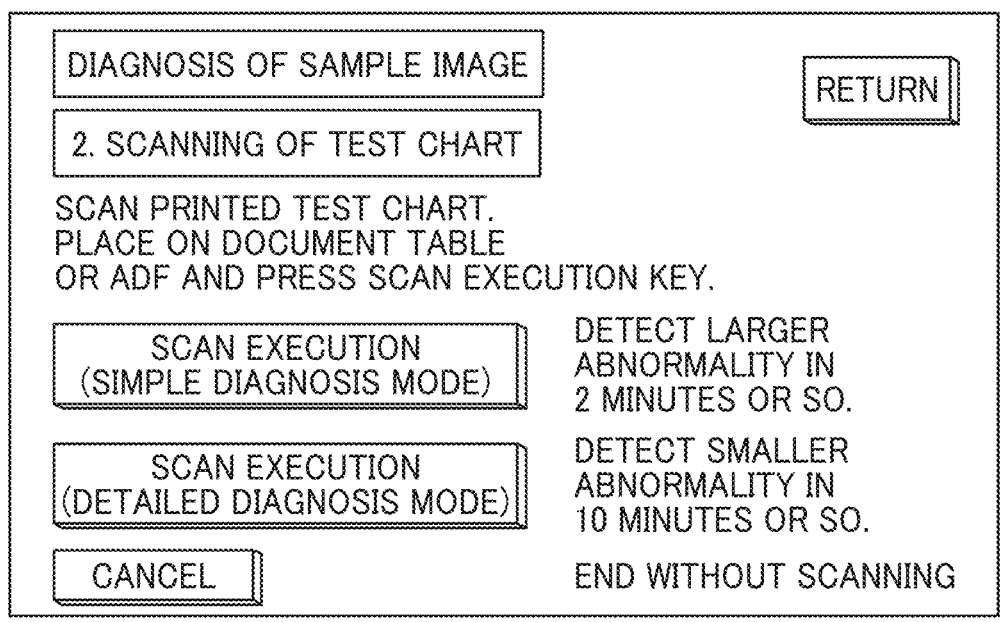

FIG. 10D illustrates a screen when the test chart is printed. To scan a printed matter of the test chart, the screen prompts the user to place the printed matter of the test chart on the document table or the ADF 10 and select the diagnosis mode. The user places the printed matter on the document table or the ADF 10, selects the "simple diagnosis mode" indicating the simple diagnosis mode or the "detailed diagnosis mode" indicating the detailed diagnosis mode to perform a diagnosis under the selected diagnosis mode. If the diagnosis is to be stopped, "cancel" can be selected.

Figure 11A:
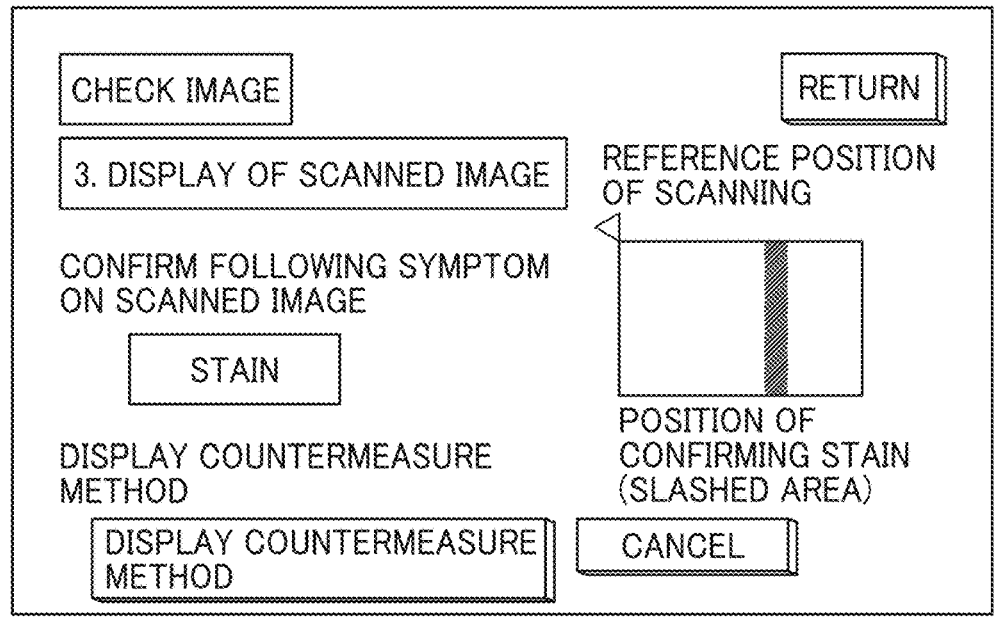
FIGS. 11A, 11B, 11C and 11D (FIG. 11) illustrate another example of shifting of operation screens.

FIG. 11A illustrates a screen displaying a diagnosis result. In this example case, "stain" is detected and a stain position is displayed. In this screen, "display countermeasure method" is displayed, and if the user wants to know the countermeasure, the user can select "display countermeasure method." If the countermeasure is not necessary, the diagnosis processing can be ended by selecting "cancel."

Figure 11B:
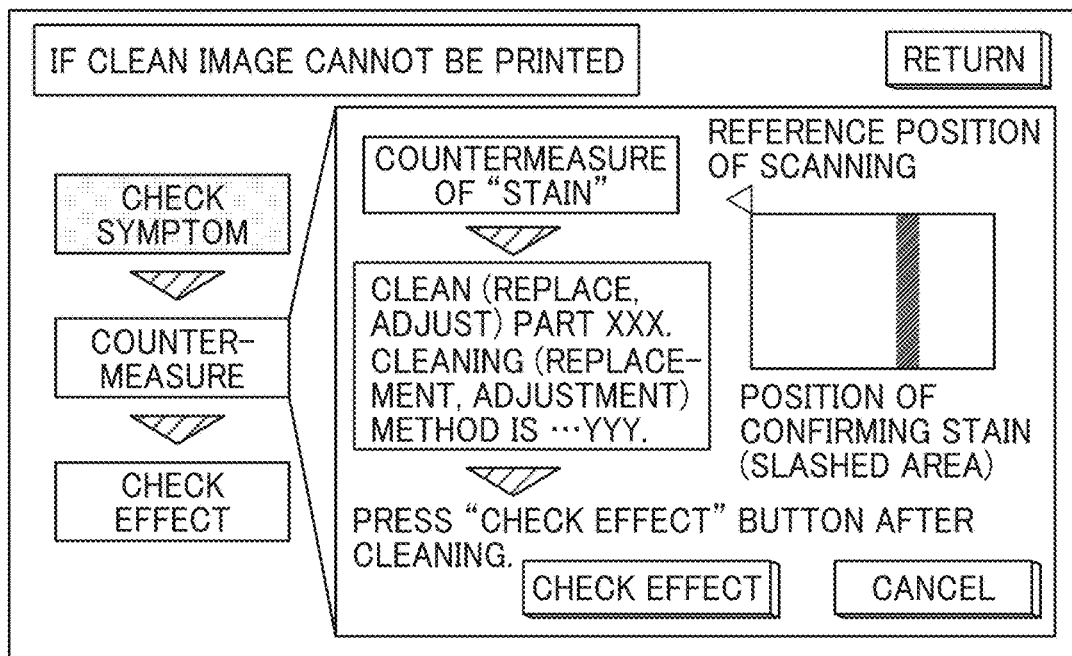

FIG. 11B illustrates a screen when "display countermeasure method" is selected in FIG. 11A. In this example case, cleaning of a part and a cleaning method of the part are displayed. The screen displays "check effect" as an option to check the effect after performing the cleaning. After the user cleans the part in accordance with the displayed cleaning method, the user can check the effect of cleaning by selecting "check effect." If the checking of effect is not necessary, "cancel" can be selected to end the sequence.

Figure 11C:
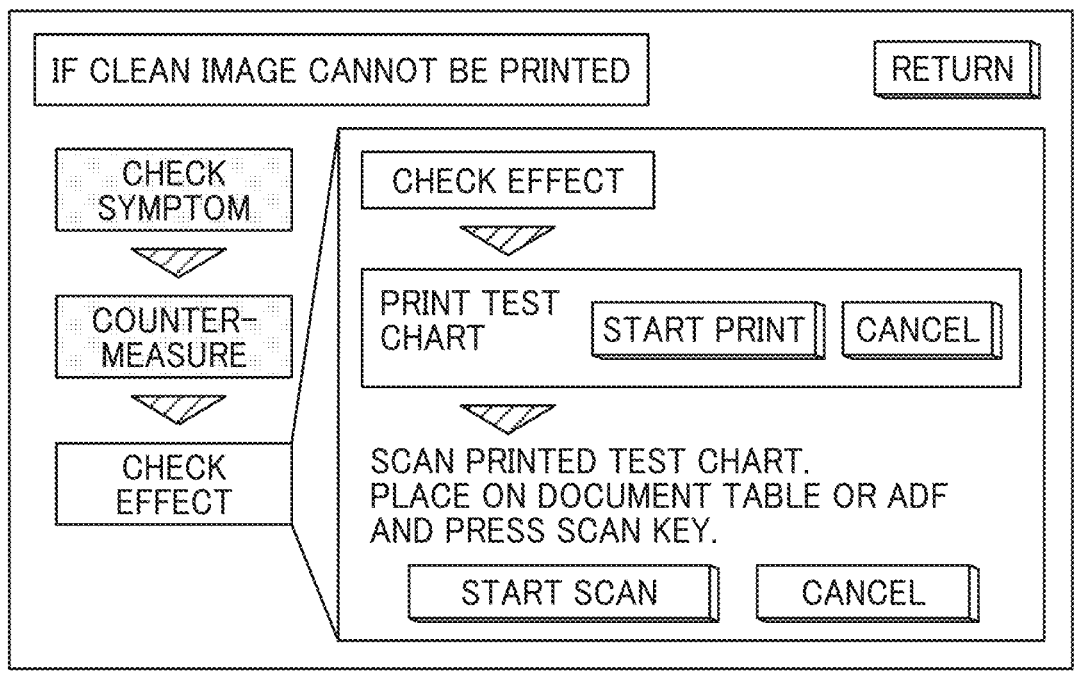

FIG. 11C illustrates a screen when "check effect" is selected in FIG. 11B. When "check effect" is selected, the screen displays an instruction to prompt the user to print the test chart, place the printed matter of test chart on the document table or ADF 10, and then scan the printed matter of test chart. The user can select "start print" in accordance with the instruction to print the test chart and then can select "start scan" to scan the printed matter of the test chart. If the printing and scanning is not performed, "cancel" can be selected to end the sequence.

Figure 11D:
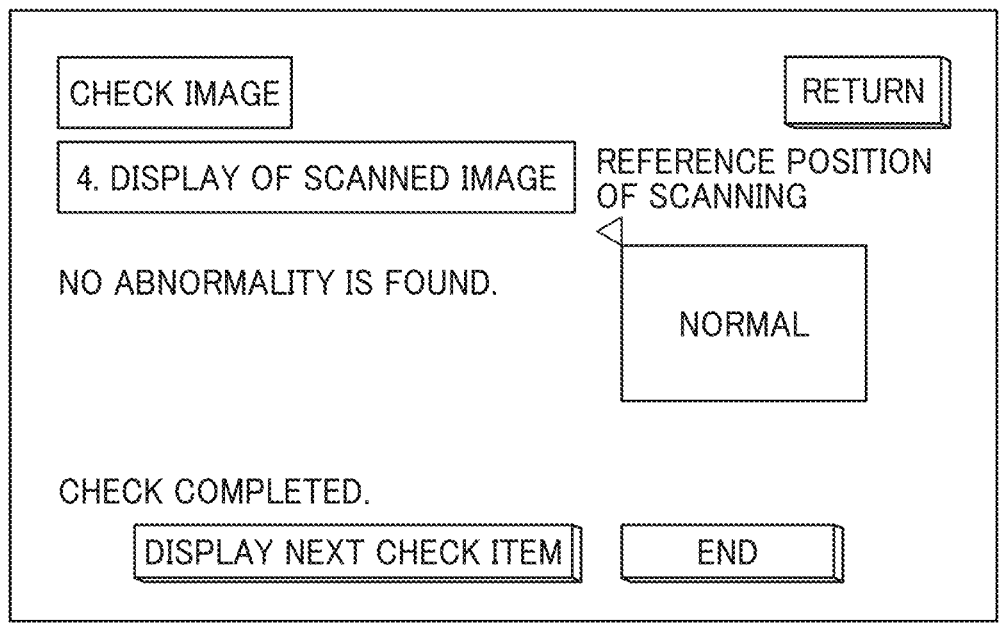

FIG. 11D illustrates a screen displaying a scan result. The screen displays whether the trouble is solved by implementing the countermeasure. In this example case, the screen displays that the trouble is solved, and the abnormality is not detected. The user can select "display next check item" on this screen. If the user selects "display next check item," the screen (FIG. 11D) returns to the screen in FIG. 10B, and another option such as "faint" and "color misregistration" can be selected. If the diagnosis processing is to be terminated at this stage, "end" can be selected.

Figure 12B:
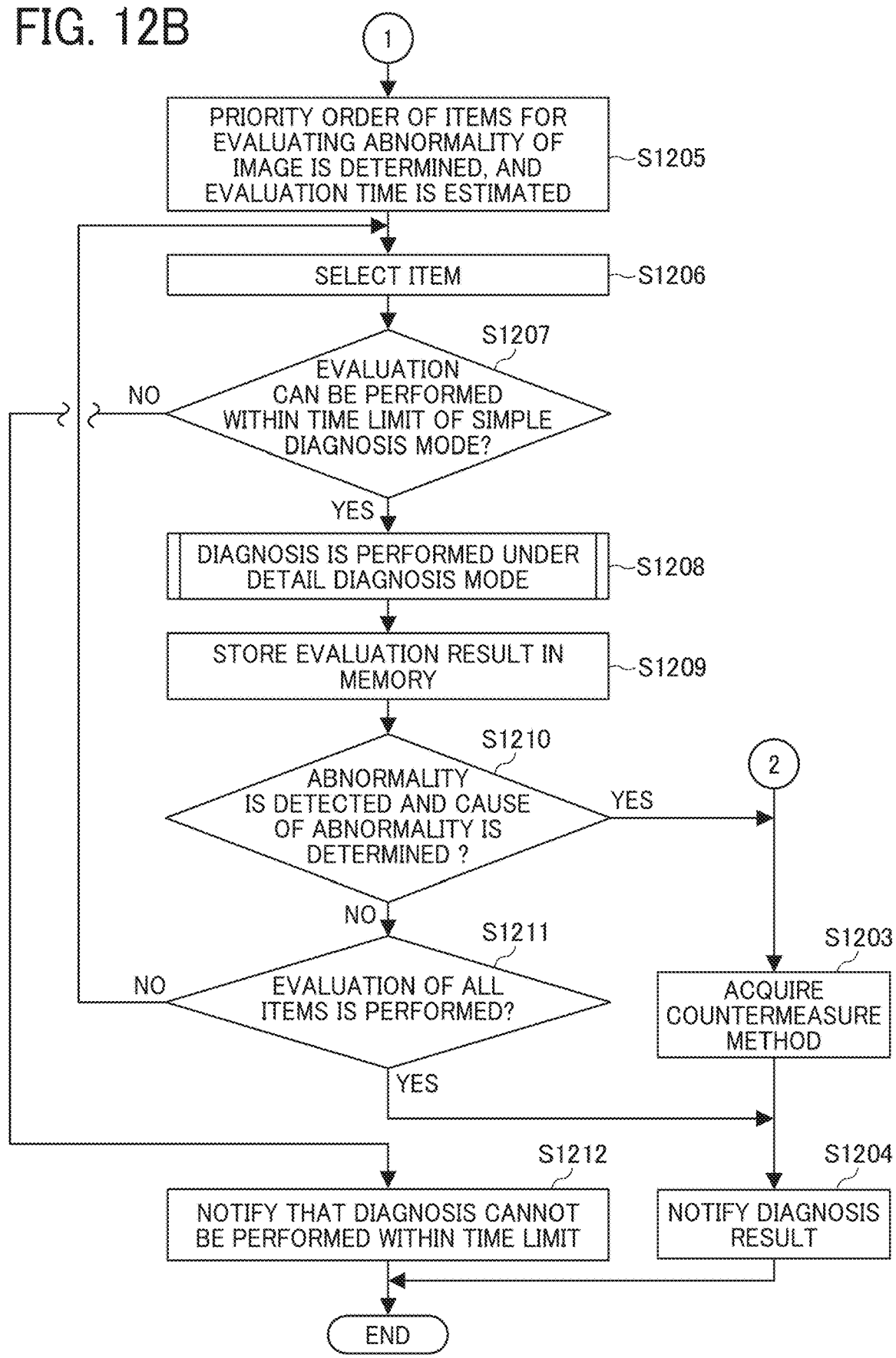

Hereinafter, a description is given of the diagnosis processing when the "simple diagnosis mode" is selected by the user in FIG. 10D with reference to FIG. 12 (FIGS. 12A and 12B).

As to the sequence under the simple diagnosis mode, in step S1201, the diagnosis is performed under the simple diagnosis mode. For example, the diagnosis is performed using a lower resolution of about 60 dpi to 150 dpi.

In step S1202, it is determined whether abnormality is detected, and it is determined whether the cause of abnormality is determined. If the cause of abnormality is determined (S1202: YES), the sequence proceeds to step S1203, in which the countermeasure method is acquired.

Then, in step S1204, a diagnosis result including the cause of abnormality and the countermeasure method is displayed on the screen using the operation unit 15 to notify the diagnosis result to the user.

If the cause of abnormality is not determined in step S1202 (S1202: NO), the sequence proceeds to step S1205, in which a priority order of the items for evaluating the abnormality of image is determined in accordance with a priority order of the detected abnormality, and an evaluation time is estimated.

In step S1206, one item is selected in the order from the highest priority.

In step S1207, it is determined whether the evaluation of abnormality can be performed under the detailed diagnosis mode before the first diagnosis time limit set for the simple diagnosis mode expires (i.e., within the first diagnosis time limit set for the simple diagnosis mode). If it is determined that the evaluation of abnormality can be performed within the first diagnosis time limit set for the simple diagnosis mode (S1207: YES), the sequence proceeds to step S1208.

In step S1208, a diagnosis is performed under the detailed diagnosis mode. For example, the diagnosis is performed to the abnormal portion detected under the simple diagnosis mode using a resolution rage of 200 to 600 dpi, which is higher than the resolution (e.g., 60 to 150 dpi) set for the simple diagnosis mode. Further, the abnormality detection is performed under the detailed diagnosis mode using the detection range extended from the simple diagnosis mode. For example, if the cyclic or periodic abnormality cannot be detected within the range of ±2 degrees of the skew amount set for the simple diagnosis mode, the range is extended to the range of +2 to +4 degrees and the range of −2 to −4 degrees to detect the cyclic abnormality.

In step S1209, the evaluation result is stored in the memory.

Then, in step S1210, it is determined whether the abnormality is detected, and it is determined whether the cause of abnormality is determined. If the cause of abnormality is determined (S1210: YES), the sequence proceeds to step S1203, in which the countermeasure method is acquired. On the other hand, if the cause of abnormality is not determined (S1210: NO), the sequence proceeds to step S1211.

In step S1211, it is determined whether the evaluation of all items has been performed. If an unevaluated item still exists (S1211: NO), the sequence returns to step S1206 and then the next item is selected.

If it is determined in step S1207 that the evaluation cannot be performed before the first diagnosis time limit set for the simple diagnosis mode expires (or within the first diagnosis time limit set for the simple diagnosis mode) (S1207: NO), the sequence proceeds to step S1212. In step S1212, a message indicating that the diagnosis cannot be performed within the first diagnosis time limit set for the simple diagnosis mode is displayed to notify a situation to the user. After the notification in steps S1204 and S1212, the sequence is ended.

Hereinafter, a description is given of a first example of the diagnosis processing under the detailed diagnosis mode in step S1208 (FIG. 12) with reference to FIG. 13. As to the diagnosis under the detailed diagnosis mode, in step S1301, it is determined whether the simple diagnosis mode is already performed before performing the detailed diagnosis mode. If the simple diagnosis mode is not yet performed (S1301: NO), the sequence proceeds to step S1302. In step S1302, the diagnosis is performed under the normal detailed diagnosis mode.

If it is determined that the diagnosis is already performed under the simple diagnosis mode (S1301: YES), the sequence proceeds to step S1303. In step S1303, it is determined whether the document to be diagnosed under the detailed diagnosis mode is identical to the document diagnosed under the simple diagnosis mode. The determination whether the document is identical or not can be performed using the above described first to third methods.

As to the first method, information such as machine number, print date and time or the like is printed on a test chart which is a document used for diagnosis, and the machine number, the print date and time or the like are read from the scanned image data, and then it is determined whether the document used for the simple diagnosis mode and the document used for the detailed diagnosis mode are identical based on whether the information is identical.

As to the second method, when the resolution for scanning the image is changed between the simple diagnosis mode and the detailed diagnosis mode, the feature detected under the simple diagnosis mode is converted into the feature under the detailed diagnosis mode using a scan resolution used for the detailed diagnosis mode, and then it is determined whether the abnormality exists at the same position in the main scanning direction or the sub-scanning direction. If the abnormality is detected at the same position, it is determined that the document used for the simple diagnosis mode and the document used for the detailed diagnosis mode are identical, and if abnormality different from the previous document is detected, it is determined that the current document is different from the previous document.

As to the third method, after the simple diagnosis mode is performed, the diagnosis is performed on the same image data under the detailed diagnosis mode, in which it is determined that the document used for the detailed diagnosis mode is same as the document used for the simple diagnosis mode if the re-scanning is not performed. For example, when image data is scanned at the resolution 600 of dpi, the image data can be converted into image data having a lower resolution (e.g., 60 to 150 dpi) for the diagnosis under the simple diagnosis mode by performing the resolution conversion, and image data having a higher resolution (e.g., 200 to 600 dpi) is generated for the diagnosis under the detailed diagnosis mode.

If it is determined that the document to be diagnosed under the detailed diagnosis mode is identical to the document diagnosed under the simple diagnosis mode in step S1303 (S1303: YES), the sequence proceeds to step S1304. In step S1304, the diagnosis under the detailed diagnosis mode is performed using the diagnosis result of the simple diagnosis mode. After the diagnosis is ended in steps S1302 and S1304, the sequence ends.

Figure 14A:
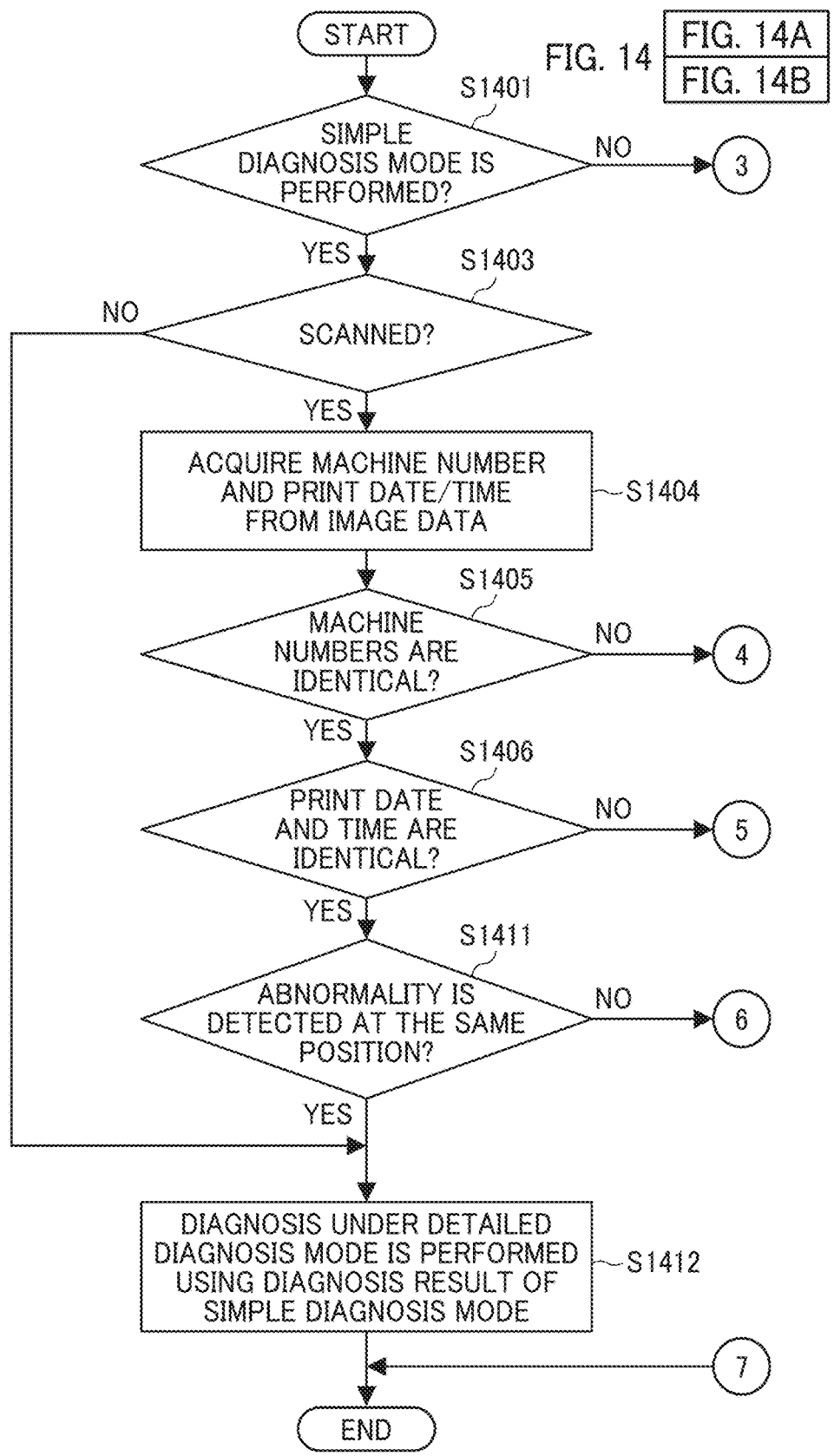
FIGS. 14A and 14B (FIG. 14) is a flowchart illustrating the steps of a second example of diagnosis processing under a detailed diagnosis mode.
Figure 14B:
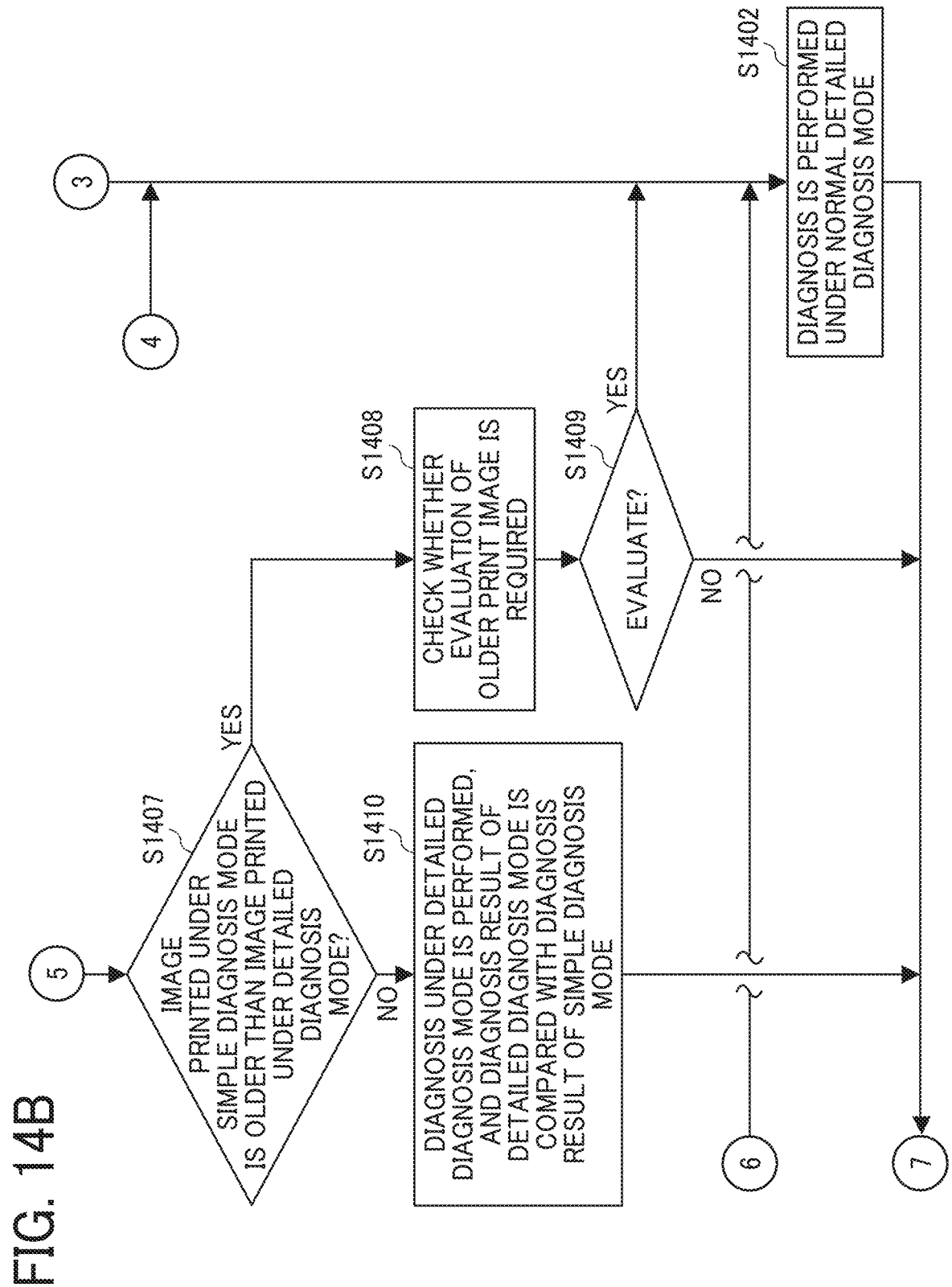

Hereinafter, a description is given of a second example of the diagnosis process under the detailed diagnosis mode in step S1208 (FIG. 12) with reference to FIG. 14 (FIGS. 14A and 14B). In this example case, a to-be-printed test pattern is added with information on the machine number, print date and time, the test pattern printed, and then the printed test pattern is scanned by the scanner 50.

Figure 13:
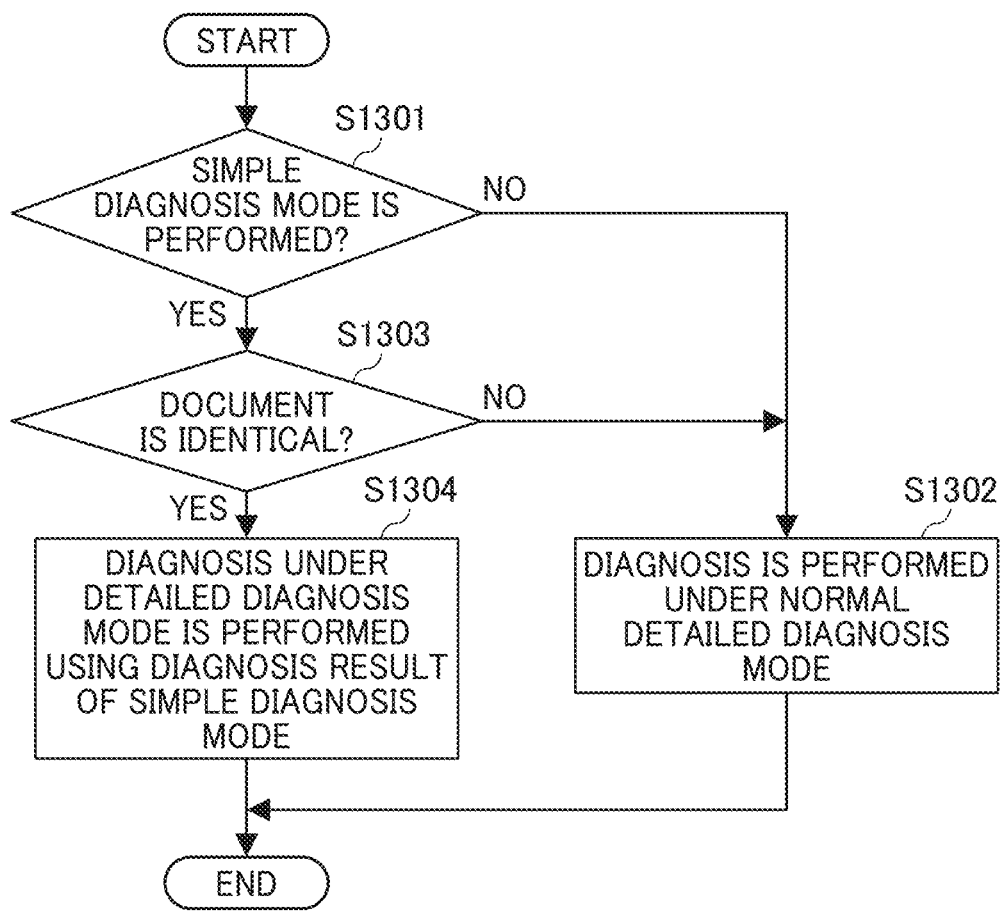
FIG. 13 is a flowchart illustrating the steps of a first example of diagnosis processing under a detailed diagnosis mode.

As to the diagnosis under the detailed diagnosis mode, in step S1401, it is determined whether the simple diagnosis mode is already performed before performing the detailed diagnosis mode as similar to step S1301 in FIG. 13. If the simple diagnosis mode is not yet performed (S1401: NO), the sequence proceeds to step S1402, in which the diagnosis is performed under the normal detailed diagnosis mode. Then, the sequence ends.

If it is determined in step S1401 that the diagnosis is already performed under the simple diagnosis mode (S1401: YES), in step S1403, it is determined whether the document is scanned. If the document is scanned (S1403: YES), that is, if a first scan operation is performed for the diagnosis under the simple diagnosis mode and a second scan operation is performed for the diagnosis under the detailed diagnosis mode, the sequence proceeds to step S1404.

In step S1404, information on the machine number and the print date and time are acquired from the image data.

In step S1405, the machine number acquired from the image data used for diagnosis under the simple diagnosis mode and the machine number acquired from the image data of the scanned image to be used for diagnosis under the detailed diagnosis mode are compared. If a comparison result indicates that the machine numbers are different (S1405: NO), such as if the machine number cannot be acquired due to blurring of printing or if the test chart printed by the different machine is scanned, the sequence proceeds to step S1402, in which the diagnosis under the normal detailed diagnosis mode is performed.

If it is determined in step S1405 that the machine numbers are identical (S1405: YES), the sequence proceeds to step S1406, in which the print date and time is compared. Similar to the machine number, if the print date and time cannot be acquired due to blurring of printing or the like, the sequence proceeds to step S1402, in which the diagnosis under the normal detailed diagnosis mode is performed.

If the print date and time are not identical in step S1406 (S1406: NO), the sequence proceeds to step S1407.

In step S1407, it is determined whether the image printed under the simple diagnosis mode is older than the image printed under the detailed diagnosis mode. If the image printed under the simple diagnosis mode is older than the image printed under the detailed diagnosis mode (S1407: YES), the sequence proceeds to step S1408.

In step S1408, the user is notified with a message that the image scanned under the simple diagnosis mode is older the image printed under the detailed diagnosis mode, and then the user is prompted whether an evaluation of the older print image is required.

If the user inputs a need of the evaluation of the older printed image (S1409: YES), the sequence proceeds to step S1402, in which the diagnosis under the normal detailed diagnosis mode is performed. On the other hand, if the evaluation is not required (S1409: NO), the sequence ends.

If it is determined that the image printed under the simple diagnosis mode is newer than the image printed under the detailed diagnosis mode in step S1407 (S1407: NO), the sequence proceeds to step S1410. Since there is a possibility that the scanning in step S1403 is performed after correcting a trouble detected during the diagnosis under the simple diagnosis mode, in step S1410, the diagnosis under the detailed diagnosis mode is performed and then the diagnosis result of the detailed diagnosis mode is compared with the diagnosis result of the simple diagnosis mode.

If the print date and time are identical in step S1406 (S1406: YES), there is a possibility that the document scanned for the diagnosis under the simple diagnosis mode and the document scanned for the diagnosis under the detailed diagnosis mode are the same document.

Therefore, in step S1411, it is determined whether the abnormality exists at the same position in the main scanning direction or the sub-scanning direction for the document scanned under the simple diagnosis mode and the document scanned under the detailed diagnosis mode, in which if the scan resolution under the simple diagnosis mode and the scan resolution under the detailed diagnosis mode are different, the coordinate positions are compared after converting the scan resolution.

If the abnormality is not detected at the same position in step S1411 (S1411: NO), it is determined the document scanned under the simple diagnosis mode and the document scanned under the detailed diagnosis mode are different, and the sequence proceeds to step S1402, in which the diagnosis under the normal detailed diagnosis mode is performed.

If the abnormality is detected at the same position for the document scanned under the simple diagnosis mode and the document scanned under the detailed diagnosis mode (S1411: YES), it is determined that the document scanned under the simple diagnosis mode and the document scanned f under the detailed diagnosis mode are the same or identical, and then, in step S1412, the diagnosis under the detailed diagnosis mode is performed using the diagnosis result of the simple diagnosis mode. Then, the sequence ends.

The user can perform the diagnosis of the image forming apparatus 1000 as described above. Hereinafter, a description is given of the test chart generated, printed, and scanned for the diagnosis with reference to FIGS. 15 to 19.

Figure 15:
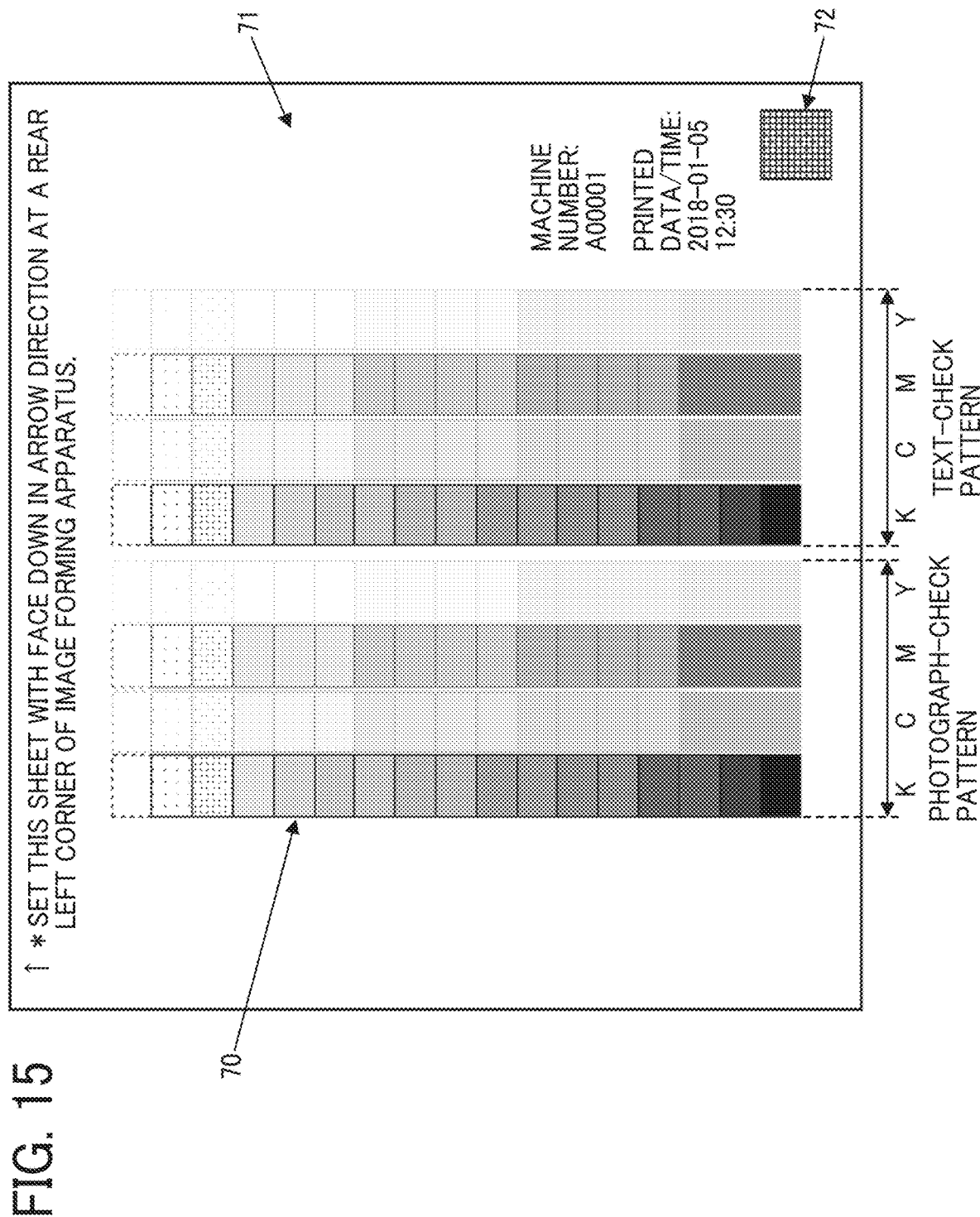
FIG. 15 illustrates a first example of a test chart for adjusting color.

FIG. 15 illustrates an example of a test chart of "color adjustment pattern 1" indicated in FIG. 4, including a gradation pattern 70 and a non-image portion 71 (e.g., background portion) not formed with an image. The "color adjustment pattern 1" is defined by a gradation pattern of all colors such as yellow, magenta, cyan, and black (YMCK). The gradation pattern 70 is a pattern changing a gradation expressed by 8 bits (256 values) of each color by changing a gradation value with a step of given constant value to set a value of 16, a value of 32, . . . , a value of 240, and a value of 256 as the gradation values. The non-image portion 71 (e.g., background portion) not formed with an image has a value of 0.

A deviation from a target gradation can be easily detected by using the gradation pattern 70. The gradation pattern 70 can be scanned by the scanner 50 and then the image processing parameters can be adjusted. As illustrated in FIG. 15, the gradation pattern 70 can include a set of two patterns such as a photograph-check pattern and a text-check pattern, but the gradation pattern 70 may include one pattern alone, such as the text-check pattern.

The test chart can be provided with patterns, characters indicating a machine number and an output date and time, a two-dimensional code 72, and a message. The message can be any message. For example, a note on scanning the printed matter can be used as the message. As illustrated in FIG. 15, the note can be, for example, "set this sheet with face down in arrow direction at a rear left corner of image forming apparatus."

In an example case in FIG. 15, the feature data includes the machine number and the output date and time, which can be set by using two types of data such as the character data and the two-dimensional code 72, but the feature data can be represented by using at least any one of the character data and the two-dimensional code 72.

Figure 16:
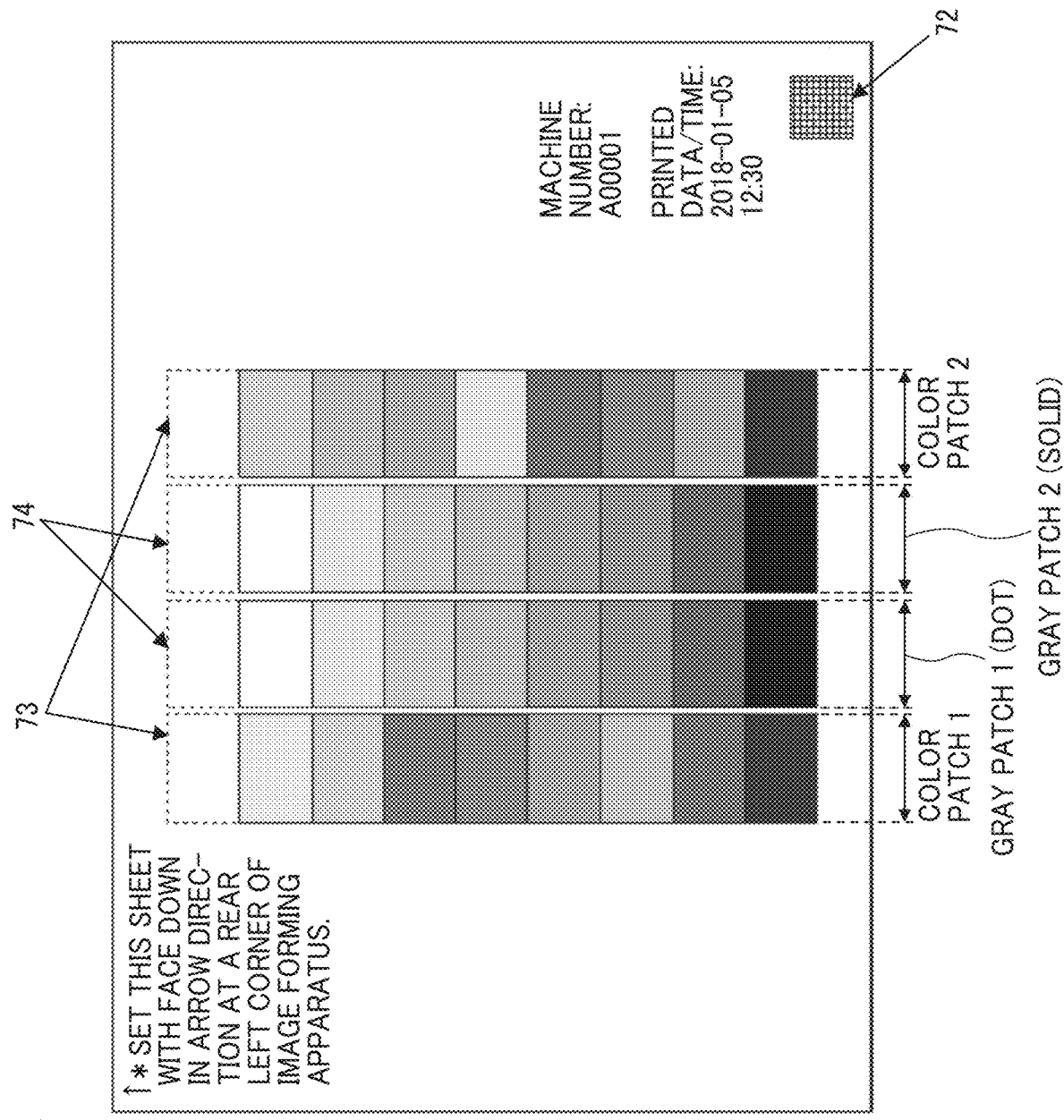
FIG. 16 illustrates a second example of a test chart for adjusting color.

FIG. 16 illustrates an example of a test chart of "color adjustment pattern 2" indicated in FIG. 4. In an example illustrated in FIG. 15, only the original colors (primary colors) such as yellow, magenta, cyan, and black are used. In an example case in FIG. 16, a color pattern 73 and a gradation pattern 74 are set. The color pattern 73 includes the primary color and secondary color generated by mixing the primary colors. The gradation pattern 74 includes tertiary color generated by mixing the primary color and the secondary color. The secondary color corresponds to, for example, blue, green and red, and the tertiary color corresponds to, for example, gray or grey.

By using such patterns, the deviation from the target color can be easily detected, the patterns can be scanned by the scanner 50 and the image processing parameters can be adjusted. When the test chart is to be printed, an image having received the gradation processing using dithering for copying or dithering for printing in accordance with the image processing parameter used by the user is printed. The dithering is a process of combining a limited number of colors to increase the number of colors to be generated.

Figure 17:
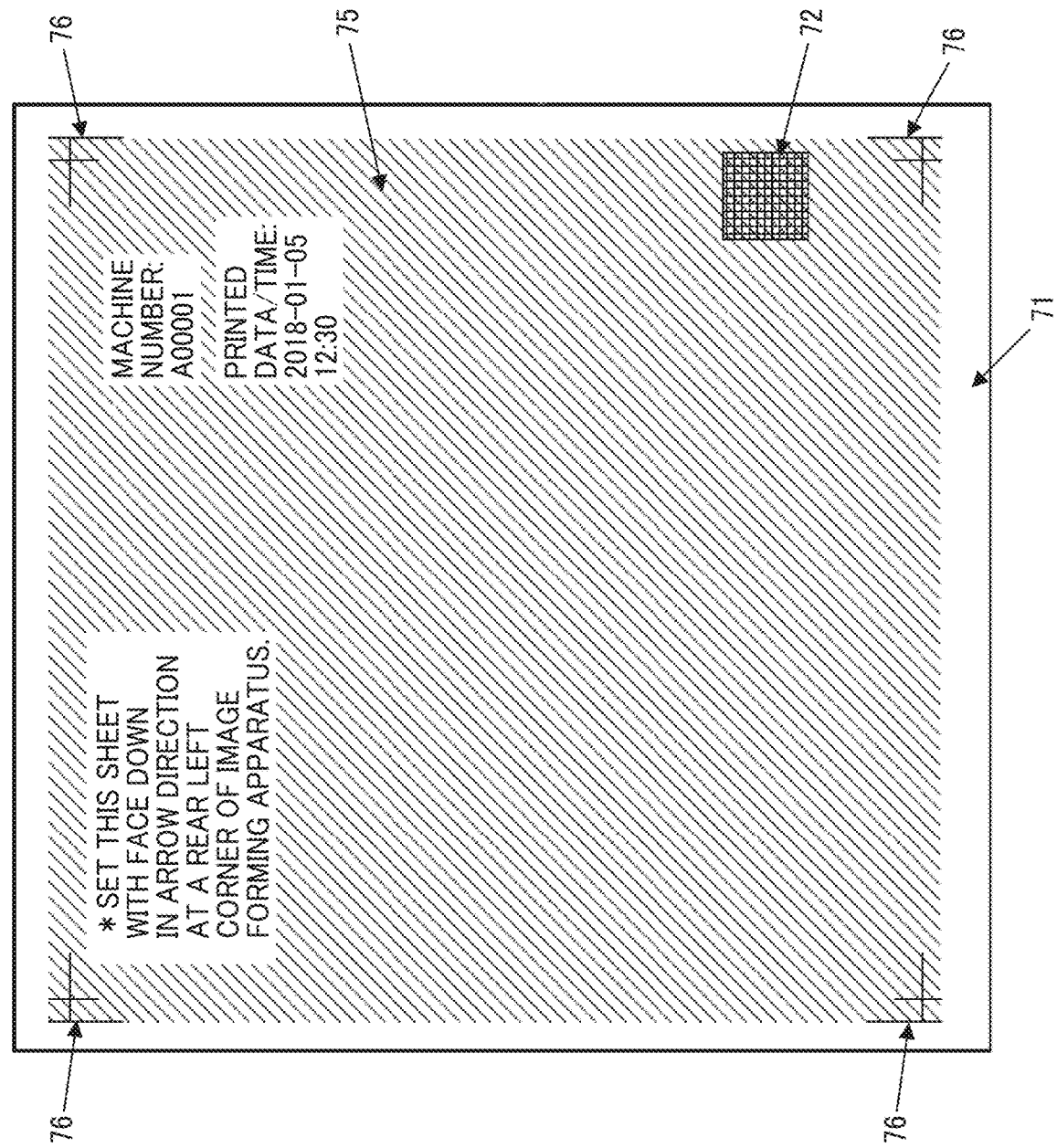
FIG. 17 illustrates an example of a test chart for detecting unevenness.

FIG. 17 illustrates an example of a test chart of "unevenness detection pattern" indicated in FIG. 4, which includes a pattern 75 formed with a uniform writing value on the entire face. That is, the pattern 75 is a test pattern set with a constant density, such as a value of 64 or a value of 128 value with respect to 8 bits (256 values). The pattern 75 can be a pattern of single color of yellow, magenta, cyan, and black printed on each sheet such as paper. Further, a sheet can be divided into segments for each color region, and a pattern of each color can be printed on each color region on one sheet as the pattern 75. Further, two or more colors can be overlayered and printed without dividing the sheet into each color region to prepare the pattern 75.

By using the pattern 75 formed by using the uniform writing value, the unevenness indicating a non-uniform writing value can be easily detected. In this example case, in addition to the machine number and the output date and time, a dragonfly pattern 76 can be provided at four corners, which serves as a guide for setting the printing area.

In FIG. 17, a region (hatched portion) indicated by an oblique line where the pattern 75 is formed indicates an image portion, and a non-hatched region indicates the non-image portion 71.

Figure 18:
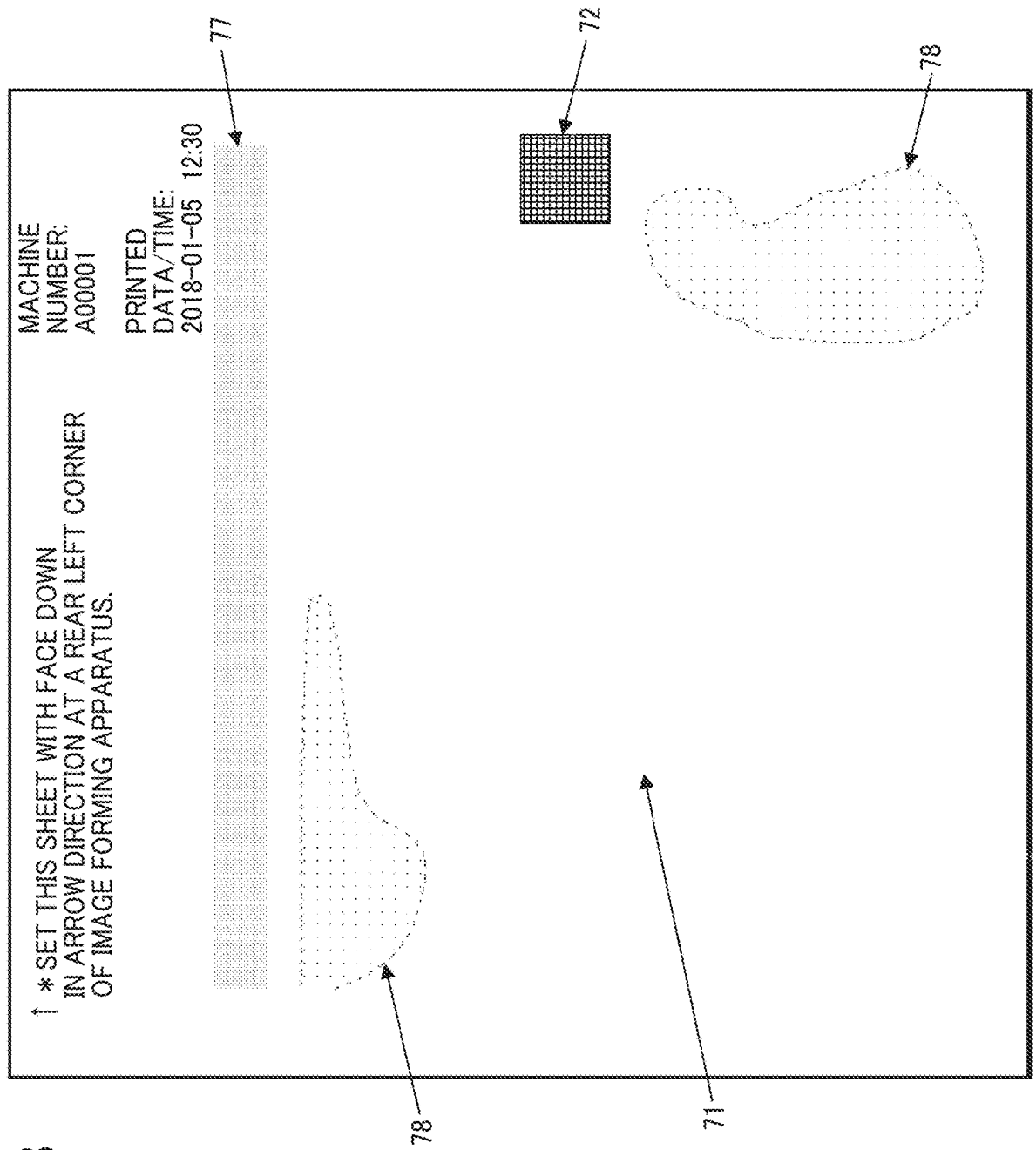
FIG. 18 illustrates an example of a test chart for detecting a background stain, and a thick density portion and a thin density portion of one color.

FIG. 18 illustrates an example of a test chart of "background stain/density detection pattern" indicated in FIG. 4. This pattern is used for detecting a background stain of one color and a thin/thick density. The pattern includes an image portion 77 and the non-image portion 71. The image portion 77 sets, for example, a value of 256 with respect to 8 bits (256 values) while the non-image portion 71 sets a value of 0 with respect to 8 bits (256 values), in which each portion is the uniform density test pattern. Further, the image portion 77 is not limited to the value of 256 and the non-image portion 71 is not limited to the value of 0. For example, to evaluate the color margin, the image portion 77 can be set with a value of 200 while the non-image portion 71 can be set with a value rage of 8 to 16. Since this is an example, the image portion 77 and the non-image portion 71 can be set with other values, such as a value of 220 and a value of 20, respectively.

In an example case in FIG. 18, by setting a region of the image portion 77 smaller and setting a region of the non-image portion 71 larger, it is easy to detect the background stain and whether the image density becomes thinner. For example, a background stain 78 exists at two portions in the non-image portion 71. Further, the region where the image portion 77 is formed is not limited to the upper side of the sheet as illustrated in FIG. 13, but can be at a lower side, a left side, and a right side of the sheet.

Figure 19:
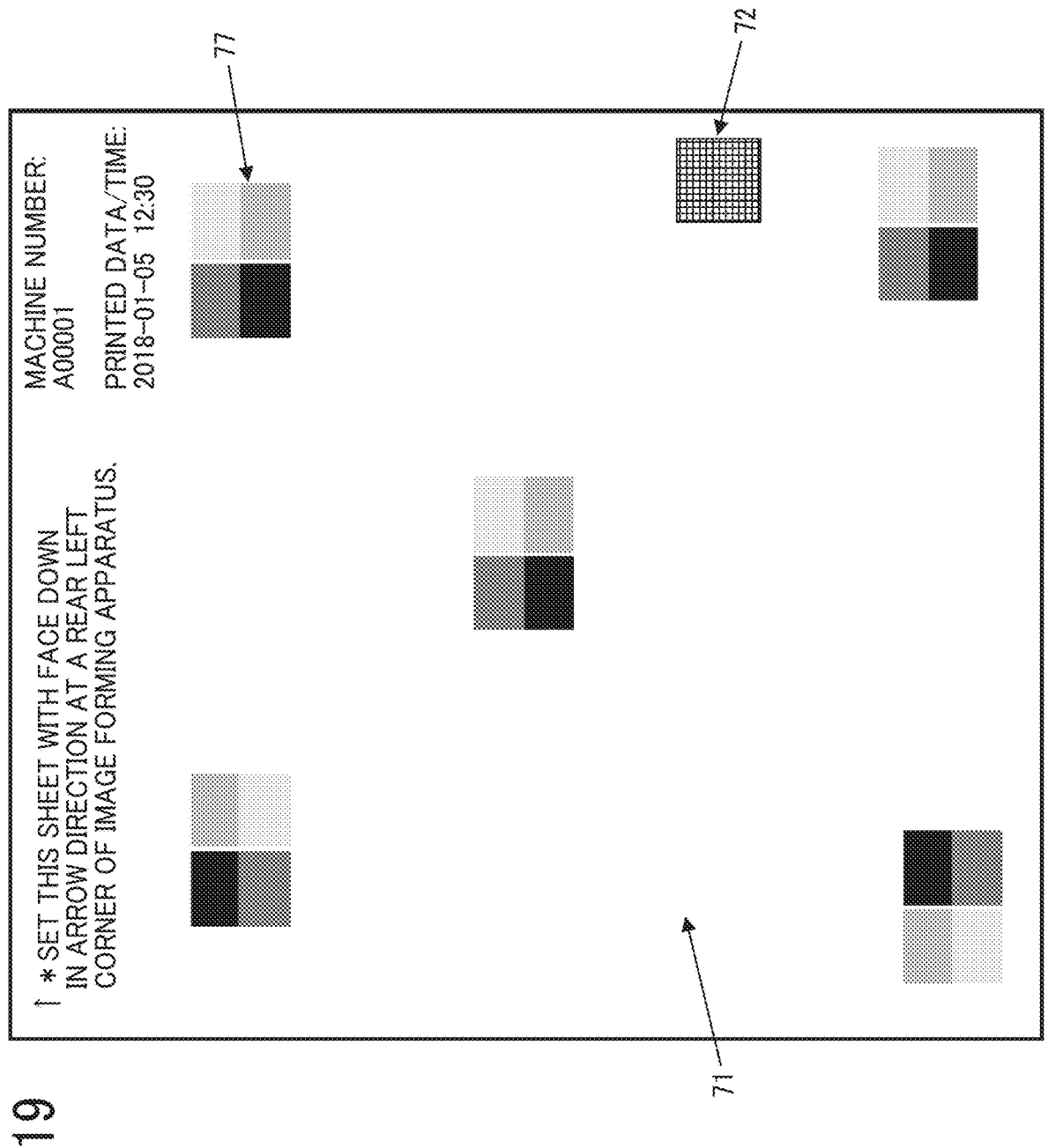
FIG. 19 illustrates an example of a test chart for detecting a background stain, and a thick density portion and a thin density portion of full color.

FIG. 19 illustrates an example of a test chart of "full-color background stain/density detection pattern" indicated in FIG. 4. This pattern is used for detecting the background stain of all colors of yellow, magenta, cyan, and black, and a thin/thick density. Similar to an example case in FIG. 18, the image portion 77 sets a value of 256 with respect to 8 bits (256 values) while the non-image portion 71 sets a value of 0 with respect to 8 bits (256 values), in which each portion is the uniform density test pattern. Different from an example case in FIG. 18, the pattern of the image portion 77 of FIG. 19 is not one-color pattern but the pattern of the image portion 77 is all-color pattern.

In this example case too, the image portion 77 and the non-image portion 71 are not limited to the value of 256 and the value of 0, respectively. For example, to evaluate the color margin, the image portion 77 can be set with a value of 200 while the non-image portion 71 can be set with a value rage of 8 to 16. Since this is an example, the image portion 77 and the non-image portion 71 can be set with other values, such as a value of 220 and a value of 20, respectively.

Further, if the size of the image portion 77 is set smaller, the background stain can be detected easily and whether the image density becomes thinner can be detected easily. In this example case, the image portion 77 is formed at four corners and the center (i.e., five portions), but not limited thereto. The image portion 77 can be formed at the upper side of sheet alone, or the image portion 77 can be formed at the lower side, left side, right side of sheet.

Conventionally, the diagnosis time period required for detecting the abnormal image and identifying the cause of abnormal image cannot be designated, and the diagnosis time period cannot be set shorter.

As to the above described embodiment of the present invention, the diagnosis system or the diagnosis method can designate the diagnosis time period, which can be set shorter, and the diagnosis can be performed efficiently using the diagnosis time period that can be set shorter.

The present invention is described with reference to the image forming apparatus, the diagnosis method, and the program of the above described embodiment. However, the present invention is not limited to the embodiment described above but can be modified within the scope of the present invention by those skilled in the art, such as using other embodiments, additions, changes, deletions, and the like. Further, any one of the embodiments can be included in the scope of the present invention as long as the embodiments exhibit the effect of the present invention.

Therefore, it is also possible to provide a recording medium recorded with the above described program, and a providing apparatus storing the above described program and providing the above described program in response to receiving a download request.

Further, the diagnosis processing may not be performed in the image forming apparatus alone. For example, the diagnosis processing can be performed in cooperation of the image forming apparatus and a server used as an external apparatus. In this case, data collected by the image forming apparatus can be transmitted to the server and the diagnosis result can be returned to the image forming apparatus from the server. Therefore, as to the diagnosis system that performs the diagnosis processing, the diagnosis system can be implemented in the image forming apparatus alone, the server alone, or both the image forming apparatus and the server. The external apparatus is not limited to the server but can be any image forming apparatus or information processing apparatus which can be connected to one or more networks.

Numerous additional modifications and variations are possible in light of the above teachings. It is therefore to be understood that, within the scope of the appended claims, the disclosure of this patent specification can be practiced otherwise than as specifically described herein. Any one of the above-described operations may be performed in various other ways, for example, in an order different from the one described above.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:
1. A diagnosis system for diagnosing an image forming apparatus comprising:
circuitry configured to
form an image to be used for diagnosing the image forming apparatus, using the image forming apparatus;

receive designation of a first diagnosis condition among a plurality of diagnosis conditions for detecting abnormality of the image formed by using the image forming apparatus;

scan, using a scanner, the image formed by the image forming apparatus;

extract feature information representing the abnormality from the scanned image in accordance with the designated first diagnosis condition;

diagnose the abnormality of the image forming apparatus based on the extracted feature information in accordance with the designated first diagnosis condition;

set a second diagnosis condition different from the first diagnosis condition when the circuitry diagnoses the formed image in accordance with the first diagnosis condition but does not acquire a diagnosis result of the formed image under the first diagnosis condition; and determine, in response to receiving designation of the second diagnosis condition after performing a diagnosis under the first diagnosis condition, whether the feature information extracted for the diagnosis under the first diagnosis condition is usable for a diagnosis under the second diagnosis condition.

2. The diagnosis system according to claim 1, wherein, in response to receiving the designation of the second diagnosis condition, the circuitry sets at least any one of a second detection range of a feature value representing an image feature for the second diagnosis condition, which is set greater than a first detection range of the feature value representing the image feature for the first diagnosis condition, and a second extraction value unit used for the second diagnosis condition to extract the feature information, which is set smaller than a first extraction value unit used for the first diagnosis condition to extract the feature information, or the circuitry collectively sets the second detection range of the feature value and the second extraction value unit to extract the feature information.

3. The diagnosis system according to claim 2, wherein, in response to the designation of the first diagnosis condition, the circuitry extracts the feature information with respect to an acceptable range of the scanned image, wherein, in response to the designation of the second diagnosis condition, the circuitry extracts the feature information with respect to an unacceptable range set outside the acceptable range of the scanned image.

4. The diagnosis system according to claim 1, wherein, in response to the designation of the second diagnosis condition, the scanner scans the formed image using a second scan resolution set higher than a first scan resolution used for scanning the formed image under the designated first diagnosis condition.

5. The diagnosis system according to claim 1, wherein the circuitry determines whether the image is formed by the same image forming apparatus substantially within the same time range based on identification information included in the formed image, the identification information including identification information identifying the image forming apparatus and information on date and time when the image is formed by the image forming apparatus.

6. The diagnosis systems according to claim 1, wherein the first diagnosis condition includes a first diagnosis time limit and the second diagnosis condition includes a second diagnosis time limit set longer than the first diagnosis time limit, wherein when the diagnosis being performed under the first diagnosis condition ends before the first diagnosis time limit expires, the circuitry sets the second diagnosis condition and performs the diagnosis under the second diagnosis condition within the first diagnosis time limit.

7. An image forming apparatus comprising:

the diagnosis system of claim 1.

8. A method of diagnosing an image forming apparatus comprising:

forming an image to be used for diagnosing the image forming apparatus, using the image forming apparatus;

receiving designation of a first diagnosis condition among a plurality of diagnosis conditions for detecting abnormality of the image formed by using the image forming apparatus;

scanning, using a scanner, the image formed by the image forming apparatus;

extracting feature information representing the abnormality from the scanned image in accordance with the designated first diagnosis condition;

diagnosing the abnormality of the image forming apparatus based on the extracted feature information in accordance with the designated first diagnosis condition;

setting a second diagnosis condition different from the first diagnosis condition when the diagnosing the abnormality of the image forming apparatus based on the extracted feature information in accordance with the designated first diagnosis condition does not acquire a diagnosis result of the formed image under the first diagnosis condition; and determining, in response to receiving designation of the second diagnosis condition, whether the feature information extracted for the diagnosis under the first diagnosis condition is usable for a diagnosis under the second diagnosis condition.

9. A non-transitory computer readable storage medium storing one or more instructions that, when performed by one or more processors, cause the one or more processors to execute a method of diagnosing an image forming apparatus comprising:

forming an image to be used for diagnosing the image forming apparatus, using the image forming apparatus;

receiving designation of a first diagnosis condition among a plurality of diagnosis conditions for detecting abnormality of the image formed by using the image forming apparatus;

scanning, using a scanner, the image formed by the image forming apparatus;

extracting feature information representing the abnormality from the scanned image in accordance with the designated first diagnosis condition;

diagnosing the abnormality of the image forming apparatus based on the extracted feature information in accordance with the designated first diagnosis conditions;

setting a second diagnosis condition different from the first diagnosis condition when the diagnosing the abnormality of the image forming apparatus based on the extracted feature information in accordance with the designated first diagnosis condition does not acquire a diagnosis result of the formed image under the first diagnosis condition; and determining, in response to receiving designation of the second diagnosis condition, whether the feature information extracted for the diagnosis under the first diagnosis condition is usable for a diagnosis under the second diagnosis condition.

* * * * *